(12) United States Patent
Goh et al.

(10) Patent No.: US 10,442,906 B2
(45) Date of Patent: Oct. 15, 2019

(54) METHOD FOR PREPARING AN OXIDE FILM ON A POLYMERIC SUBSTRATE

(71) Applicant: Agency for Science, Technology and Research, Singapore (SG)

(72) Inventors: Kia Liang Gregory Goh, Singapore (SG); Jing Li, Singapore (SG); Hong Quang Le, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 205 days.

(21) Appl. No.: 15/527,849

(22) PCT Filed: Nov. 20, 2015

(86) PCT No.: PCT/SG2015/050466
§ 371 (c)(1),
(2) Date: May 18, 2017

(87) PCT Pub. No.: WO2016/080918
PCT Pub. Date: May 26, 2016

(65) Prior Publication Data
US 2018/0346673 A1  Dec. 6, 2018

(30) Foreign Application Priority Data

Nov. 20, 2014  (SG) .......................... 10201408209V

(51) Int. Cl.
| | | |
|---|---|---|
| *C08J 7/04* | (2006.01) | |
| *C08K 5/5425* | (2006.01) | |
| *C08K 5/5415* | (2006.01) | |
| *B05D 1/36* | (2006.01) | |
| *C08K 5/5419* | (2006.01) | |
| *B05D 5/00* | (2006.01) | |
| *C08K 5/548* | (2006.01) | |
| *C08K 5/5435* | (2006.01) | |
| *B05D 7/00* | (2006.01) | |
| *C09D 183/06* | (2006.01) | |
| *C09D 183/08* | (2006.01) | |
| *C08J 7/06* | (2006.01) | |
| *C23C 18/12* | (2006.01) | |
| *C08G 77/14* | (2006.01) | |
| *C08G 77/26* | (2006.01) | |

(52) U.S. Cl.
CPC ............... *C08J 7/045* (2013.01); *B05D 1/36* (2013.01); *B05D 5/00* (2013.01); *B05D 7/52* (2013.01); *C08J 7/06* (2013.01); *C08K 5/548* (2013.01); *C08K 5/5415* (2013.01); *C08K 5/5419* (2013.01); *C08K 5/5425* (2013.01); *C08K 5/5435* (2013.01); *C09D 183/06* (2013.01); *C09D 183/08* (2013.01); *C23C 18/1216* (2013.01); *C23C 18/1233* (2013.01); *B05D 2201/00* (2013.01); *C08G 77/14* (2013.01); *C08G 77/26* (2013.01); *C08J 2369/00* (2013.01)

(58) Field of Classification Search
CPC .......... C08J 7/045; C08J 7/06; C08J 2369/00; C23C 18/1233; C23C 18/1216; C09D 183/06; C09D 183/08; C08G 77/26; C08G 77/14; C08K 5/5415; C08K 5/5419; C08K 5/5425; C08K 5/5435; C08K 5/548; B05D 1/36; B05D 5/00; B05D 7/52; B05D 2201/00
See application file for complete search history.

(56) References Cited

U.S. PATENT DOCUMENTS

2003/0017303 A1* 1/2003 Shindo .................. B82Y 30/00
428/141

FOREIGN PATENT DOCUMENTS

| CN | 103160921 A | 6/2013 |
| WO | 2015016777 A1 | 2/2015 |

OTHER PUBLICATIONS

Yang, H., et al., "Synthesis of TiO2 thin films oriented by self-assembly layers," Chemical Industry and Engineering, Jul. 31, 2007, vol. 24, No. 4, pp. 287-290. (Year: 2007).*

Masuda, Y., et al., "Deposition Mechanism of Anatase TiO2 on Self-Assembled Monolayers from an Aqueous Solution," Chemistry of Materials, May 23, 2003, vol. 15, No. 12, pp. 2469-2476. (Year: 2003).*

Yang et al., "Synthesis of TiO2 Thin Films Oriented by Self-Assembly Layers," Chemical Industry and Engineering, vol. 24, No. 4, Jul. 31, 2007, pp. 287-290.

(Continued)

*Primary Examiner* — William P Fletcher, III
(74) *Attorney, Agent, or Firm* — Winstead, P.C.

(57) ABSTRACT

Various embodiments refer to a method for preparing an oxide film on a polymeric substrate, wherein the oxide film is a titanium oxide film (which is optionally niobium- or silicon-doped) or silicon oxide film. The method comprises contacting a polymeric substrate with a liquid reagent comprising a polyalkoxysilane such as 3-aminopropyltriethoxysilane to form a layer of the polyalkoxysilane on the polymeric substrate by self-assembly, and contacting said layer with an aqueous mixture comprising (i) titanium tetrafluoride and/or a fluorine-containing titanium complex such as ammonium hexafluorotitanate and/or a fluorine-containing silicon complex such as ammonium hexafluorosilicate, and (ii) a fluorine scavenger such as boric acid, at a temperature of less than about 100° C. to obtained the oxide film on the polymeric substrate. An oxide film prepared by said method is also provided.

20 Claims, 26 Drawing Sheets

(56) References Cited

OTHER PUBLICATIONS

Masuda et al., "Deposition Mechanism of Anatase TiO2 on Self-Assembled Monolayers from an Aqueous Solution," Chemistry of Materials, vol. 15, No. 12, May 23, 2003, pp. 2469-2476.
Manole et al., "Optical Properties of Nb-doped TiO2 Thin Films Prepared by Sol-Gel Method," Ceramics International, vol. 39, Nov. 29, 2012, pp. 4771-4776.
Goh et al., "Epitaxy of Porous and Photocatalytically Active TiO2 Films at 50° C.," Aust. J. Chem, vol. 64, 2011, pp. 1235-1238.
Fateh et al., "Highly Active Crystalline Mesoporous TiO2 Films Coated onto Polycarbonate Substrates for Self-Cleaning Applications," J. Phys. Chem. C, vol. 115, 2011, pp. 10405-10411.
Huang et al., "Optimization of Pretreatment for Liquid-Phase Deposition of SiO2 on ARTON Plastic Substrate," Journal of Electronic Materials, vol. 32, No. 6, 2003, pp. 478-482.
Gao et al., "Light-Excited Superhydrophilicity of Amorphous TiO2 Thin Films Deposited in an Aqueous Peroxotitanate Solution," Langmuir, vol. 20, 2004, pp. 3188-3194.
Kafizas et al., "Combinatorial Atmospheric Pressure Chemical Vapour Deposition (cAPCVD) of Niobium Doped Anatase; Effect of Niobium on the Conductivity and Photocatalytic Activity," J. Mater. Chem., vol. 20, 2010, pp. 8336-8349.
Machida et al., "The Effect of SiO2 Addition in Super-Hydrophilic Property of TiO2 Photocatalyst," Journal of Materials Science, vol. 34, 1999, pp. 2569-2574.
Permpoon et al., "Natural and Persistent Superhydrophilicity of SiO2/TiO2 and TiO2/SiO2 Bi-Layer Films," Thin Solid Films, vol. 516, No. 6, 2008, pp. 957-966.
Houmard et al., "Enhanced Cleanability of Super-Hydrophilic TiO2—SiO2 Composite Surfaces Prepared via a Sol-Gel Route," Surface Science, vol. 605, 2011, pp. 456-462.
Houmard et al., "Enhanced Persistence of Natural Super-Hydrophilicity in TiO2—SiO2 Composite Thin Films Deposited via a Sol-Gel Route," Surface Science, vol. 602, 2008, pp. 3364-3374.
Search Report issued by the Intellectual Property Office of Singapore for Singapore Patent Application No. 11201704003P dated Dec. 13, 2017, pp. 1-3.
Written Opinion issued by the Intellectual Property Office of Singapore for Singapore Patent Application No. 11201704003P dated Dec. 13, 2017, pp. 1-8.
International Preliminary Report on Patentability for International Application No. PCT/SG2015/050466 dated May 23, 2017, pp. 1-9.
Written Opinion of the International Searching Authority for International Application No. PCT/SG2015/050466 dated Dec. 28, 2015, pp. 1-8.

\* cited by examiner (A)

| Crumbling | Example | Rating |
|---|---|---|
| No | | 0 = Excellent |
| < 5% | | 1 = very good |
| 5%-15% | | 2 = good |
| 15%-35% | | 3 = moderate |
| 35%-65% | | 4 = poor |
| > 65% | - | 5 = very poor |

(A)

(B)

(A)

(B)

(C)

(D)

(A)

(B)

(A)

(B)

(A)

(B)

(A)

(B)

(A)

(B)

(C)

(D)

(A)
(i)

(ii)

(A)
(iii)

(B)
(i)

(B)
(ii)

(iii)

METHOD FOR PREPARING AN OXIDE FILM ON A POLYMERIC SUBSTRATE

CROSS-REFERENCE TO RELATED APPLICATION

This application claims the benefit of priority of Singapore patent application No. 10201408209V filed on 20 Nov. 2014, the content of which is incorporated herein by reference in its entirety for all purposes.

TECHNICAL FIELD

Various embodiments relate a method for preparing an oxide film on a polymeric substrate, and an oxide film prepared using the method.

BACKGROUND

Optically transparent polymeric substrates, such as polymethylmethacrylate (PMMA) and polycarbonate (PC), are of interest as replacement for glass in applications where there is potential for impact, such as vehicle windows or safety goggles. Of these, polycarbonate (PC) is a choice of material for use as windows in building structures and automobiles. Unfortunately, water forms droplets on a surface of polycarbonate due to its high water contact angle of about 95°. When a surface of polycarbonate gets wet such as in the event of rain, for example, this may result in streaking of the polycarbonate surface. Upon drying, the polycarbonate surface becomes dirty due to segregation of dirt along the edges of the streaks or droplets as a result of the coffee-ring effect.

To resolve this, surface modification to obtain superhydrophilic surfaces having water droplet contact angle smaller than 10° have attracted great attention. A superhydrophilic coating may be applied to a surface of the polycarbonate to allow water to spread quickly, thereby avoiding streaking of dirt on surfaces to allow formation of cleaner surfaces. Unfortunately, as the surface becomes contaminated with organics from the surroundings such as sweat or fumes with time, efficacy of this mechanism decreases and the surface would need to be cleaned chemically or physically.

Superhydrophilic surfaces may be obtained using photocatalytically active materials such as titanium dioxide ($TiO_2$), which become superhydrophilic upon illumination of UV light. These superhydrophilic films induced by photocatalytic activity, however, lose their superhydrophilicity a few minutes to hours after removal of the UV irradiation, or after storing in the dark. Furthermore, in case of titanium dioxide, the crystalline titanium dioxide coats may only be applied on surfaces at temperatures above 600° C. (e.g. Pilkington Activ). This limits application of the titanium dioxide coats to only materials that are able to withstand the high temperatures, hence temperature sensitive substrates, for example, polycarbonate which has a glass transition temperature of about 150° C., and organic substrates cannot be used. State of the art superhydrophilic films are also not photocatalytically active.

In view of the above, there remains a need for improved films or coatings and method of preparing the films or coatings that overcome or at least alleviate one or more of the above-mentioned problems.

SUMMARY

In a first aspect, various embodiments refer to a method for preparing an oxide film on a polymeric substrate, wherein the oxide film is a titanium oxide film or a silicon oxide film. The method comprises a) contacting a polymeric substrate with a liquid reagent comprising a polyalkoxysilane and forming a layer of the polyalkoxysilane on the polymeric substrate by self-assembly, and b) contacting the layer of the polyalkoxysilane on the polymeric substrate with an aqueous mixture comprising (i) titanium tetrafluoride and/or a fluorine-containing titanium complex and/or a fluorine-containing silicon complex, and (ii) a fluorine scavenger, at a temperature of less than about 100° C. to obtain the oxide film on the polymeric substrate.

In a second aspect, various embodiments refer to an oxide film prepared by a method according to the first aspect, wherein the oxide film is a titanium oxide film or a silicon oxide film.

BRIEF DESCRIPTION OF THE DRAWINGS

The invention will be better understood with reference to the detailed description when considered in conjunction with the non-limiting examples and the accompanying drawings, in which:

FIG. 13(c) shows a standard reference for determining quality of adhesion of a film.

DETAILED DESCRIPTION

Figure 1:
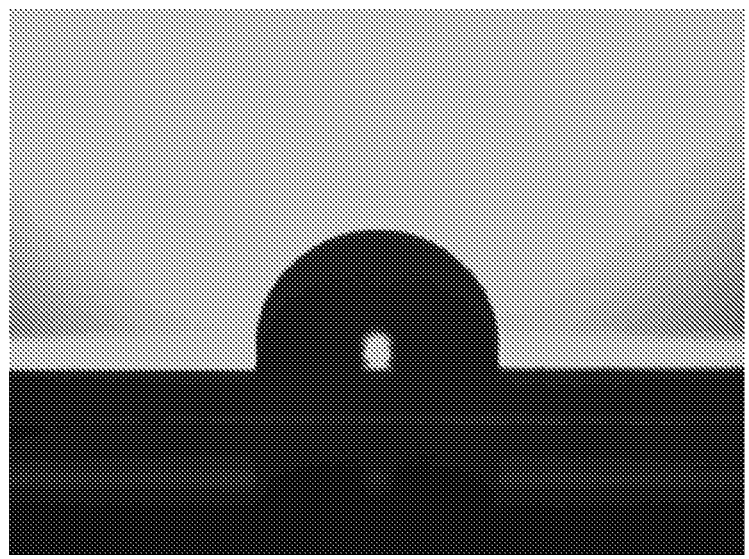
FIG. 1 depicts spreading of 3.0 µL water droplet during contact angle measurement, showing hydrophilic behavior of (A) polycarbonate (PC) substrate, and (B) PC with self-assembled monolayer (SAM) coating.
Figure 1:
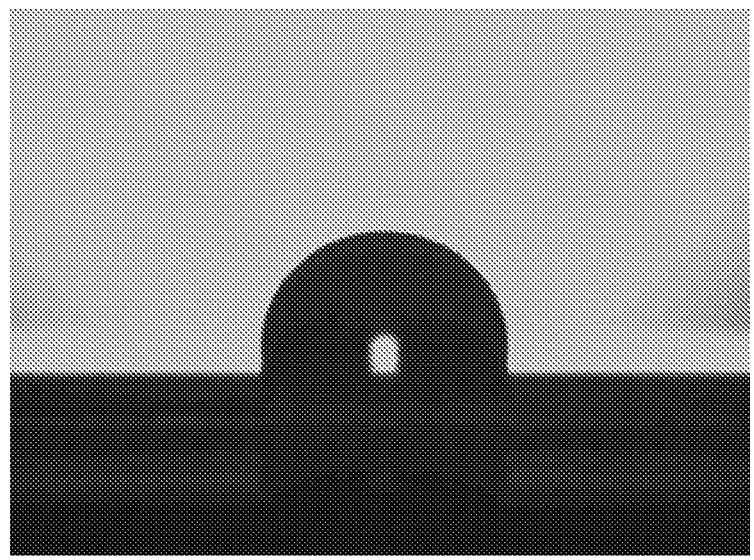

Methods disclosed herein may be based on the liquid phase deposition (LPD) technique for depositing an oxide film such as a titanium oxide film or a silicon oxide film on a polymeric substrate such as polycarbonate. This may be carried out by first forming a layer of a polyalkoxysilane such as 3-aminopropyltriethoxysilane on the polymeric substrate, with subsequent deposition of an oxide film on the layer of polyalkoxysilane.

Generally, deposition on polymeric substrates using aqueous growth solutions are challenging as hydrophobic surface of the polymeric substrates makes nucleation and growth of the film difficult. The inventors have surprisingly found that, even though the layer of polyalkoxysilane forms a hydrophobic layer on the polymeric substrate (as evidenced by water contact angle measurements shown in FIG. 1), when the layer of polyalkoxysilane is contacted with an aqueous mixture comprising (i) titanium tetrafluoride and/or a fluorine-containing titanium complex and/or a fluorine-containing silicon complex, and (ii) a fluorine scavenger using a liquid phase deposition process to form an oxide film on the polyalkoxysilane layer, a superhydrophilic oxide film may be obtained. Through use of the layer of polyalkoxysilane, methods for preparing an oxide film disclosed herein do not require that the polymeric substrate surface be extremely hydrophilic or superhydrophilic for preparing the oxide films.

Advantageously, the oxide films disclosed herein are multi-functional as they are able to exhibit transparency and/or superhydrophilicity. Due to their transparency, the oxide films are suitable for use in various optical applications. The films may also be anti-fogging and ultra-wetting due to their superhydrophilicity. As photocatalytic activation or UV illumination is not required to activate superhydrophilicity of the films, this renders the oxide films suitable for night time and low-light, indoor use. In the case of titanium oxide film, it is also able to exhibit photocatalytic activity, which may translate into self-cleaning, odor degrading, and/or sterilizing properties of the film.

Furthermore, use of the liquid phase deposition technique allows formation or growth of an oxide film at temperatures of 100° C. or less. As the oxide films may be superhydrophilic as-grown due to their porous nature, heat treatment post-growth is not required. Annealing at high-temperatures, which is required in sol-gel processing, is also not necessary. This means that methods disclosed herein may be used to prepare oxide films on polymeric substrates which are generally temperature sensitive, and/or are not able to withstand high temperature processing. One specific example is polycarbonate which has a glass transition temperature of about 150° C., hence not suitable for use in method such as sol-gel deposition.

Methods disclosed herein are simple processes, which require low costs to set up as complex equipments are not used. The film deposition process may be scaled up easily as it may be carried out over a large area, and conformably on complex shapes and porous substrates.

With the above in mind, various embodiments refer in a first aspect to a method for preparing an oxide film on a polymeric substrate, wherein the oxide film is a titanium oxide film or a silicon oxide film.

The method comprises contacting a polymeric substrate with a liquid reagent comprising a polyalkoxysilane and forming a layer of the polyalkoxysilane on the polymeric substrate by self-assembly.

The term "polymeric substrate" as used herein refers to a solid support having a surface formed of a polymer or a solid support which is formed entirely of a polymer. The term "polymer" as used herein refers generally to a macromolecule composed of repeating monomer units. For example, the polymer may be an organic polymer, such as a polymer comprising carbon and hydrogen atoms, and may be formed by polymerizing monomers. Glass does not constitute a polymer referred to herein. In various embodiments, the polymeric substrate is formed entirely of a polymer.

The polymeric substrate may comprise an optically transparent polymer. The term "optically transparent polymer" is used herein to refer to a polymeric material which has a transmittance of at least 50% at a wavelength in the visible spectrum of about 400 nm to about 800 nm. Examples of an optically transparent polymer include, but are not limited to, polycarbonate, polymethylmethacrylate, polyethylene terephthalate, copolymers thereof, or combinations thereof. In various embodiments, the polymeric substrate comprises or consists of polycarbonate.

The polycarbonate may, for example, be in the form of a polymer obtainable by reacting a carbonate precursor such as phosgene with a dihydric phenol such as bisphenol-A in the presence of an alkali metal hydroxide such as sodium hydroxide. Advantageously, polycarbonate has good chemical stability, low weight and cost, high mechanical strength, and excellent transparency, which confer versatility for its use in a myriad of applications.

Shape and structure of the polymeric substrate may be arbitrarily selected, and is not limited to a planar surface. For example, the polymeric substrate may have a non-planar shape, or be in the form of a product, or a portion of a building having a polymeric surface onto which the oxide film is to be applied.

The polymeric substrate is contacted with a liquid reagent comprising a polyalkoxysilane, and a layer of the polyalkoxysilane is formed on the polymeric substrate by self-assembly. By forming a layer of the polyalkoxysilane on the polymeric substrate, oxide films may be formed on the polymeric substrate without the need to modify the polymeric substrate surface to render it extremely hydrophilic or superhydrophilic for depositing the oxide films. In embodiments wherein the polymeric substrate is in the form of a metal support having a polymer on a surface, for example, the layer of the polyalkoxysilane is formed on the surface of the polymer.

The term "self-assembly" (SA) as used herein refers to processes in which a disordered system of pre-existing components forms an organized structure or pattern as a consequence of specific, local interactions among the components themselves, without external direction. It may be defined as the spontaneous and reversible organization of molecular units into ordered structures by non-covalent interactions.

In various embodiments, the polyalkoxysilane forms a self-assembled monolayer on the polymeric substrate, such that some of, at least a substantial portion of, or all of the surface area of the polymeric substrate that is exposed to the liquid reagent comprising the polyalkoxysilane is covered by the polyalkoxysilane.

In various embodiments, the polyalkoxysilane is selected from the group consisting of 3-aminopropyltriethoxysilane (APTES), 3-aminopropyl-diethoxy-methylsilane, 3-aminopropyl-dimethyl-ethoxysilane (APDMES), 3-aminopropyl-trimethoxysilane (APTMS), 3-glycidoxypropyl-dimethyl-ethoxysilane (GPMES), 3-mercaptopropyl-trimethoxysilane (MPTMS), 3-mercaptopropyl-methyl-dimethoxysilane (MPDMS), and combinations thereof. In specific embodiments, the polyalkoxysilane comprises or consists of 3-aminopropyltriethoxysilane.

The layer of the polyalkoxysilane on the polymeric substrate is contacted with an aqueous mixture comprising (i) titanium tetrafluoride and/or a fluorine-containing titanium complex and/or a fluorine-containing silicon complex, and (ii) a fluorine scavenger, at a temperature of less than about 100° C. to obtain the oxide film on the polymeric substrate.

Contacting the layer of the polyalkoxysilane on the polymeric substrate with the aqueous mixture may be carried out by immersing the surface of polymeric substrate containing the layer of the polyalkoxysilane in the aqueous mixture. In various embodiments, the aqueous mixture is supersaturated, such that by immersing the surface of polymeric substrate containing the layer of the polyalkoxysilane, the oxide film may be formed on the layer of the polyalkoxysilane.

The oxide film may be precipitated on at least a portion of the layer of the polyalkoxysilane that is in contact with the aqueous mixture. In various embodiments, the oxide film is precipitated on substantially all of the surface of the polyalkoxysilane layer that is in contact with the aqueous mixture.

The aqueous mixture comprises titanium tetrafluoride ($TiF_4$) and/or a fluorine-containing titanium complex and/or a fluorine-containing silicon complex, and a fluorine scavenger. In various embodiments, the aqueous mixture comprises a fluorine-containing titanium complex and/or a fluorine-containing silicon complex, and a fluorine scavenger. The fluorine-containing titanium complex and the fluorine-containing silicon complex in the aqueous mixture may have general formula $A_2MF_6$, wherein M is Ti or Si, and A is selected from the group consisting of an ammonium group, hydrogen, alkali metal, coordinated water, and combinations thereof.

The fluorine-containing titanium complex may, for example, be hexafluorotitanic acid, sodium hexafluorotitanate, potassium hexafluorotitanate, ammonium hexafluorotitanate, or combinations thereof. In specific embodiments, the fluorine-containing titanium complex comprises or consists of ammonium hexafluorotitanate (($NH_4)_2TiF_6$).

The fluorine-containing silicon complex may, for example, be hexafluorosilicic acid, ammonium hexafluorosilicate, sodium fluorosilicate, potassium fluorosilicate, or mixtures thereof. In specific embodiments, the fluorine-containing silicon complex comprises or consists of ammonium hexafluorosilicate (($NH_4)_2SiF_6$).

The term "fluorine scavenger" as used herein refers to a compound or element that is capable of capturing fluoride ions in the aqueous mixture comprising the titanium tetrafluoride and/or the fluorine-containing titanium complex and/or the fluorine-containing silicon complex to precipitate the corresponding oxide. By providing an aqueous mixture comprising the titanium tetrafluoride and/or the fluorine-containing titanium complex and/or the fluorine-containing silicon complex, and a fluorine scavenger, and contacting a polymeric substrate having a layer of polyalkoxysilane formed thereon with the aqueous mixture, an oxide film may be precipitated or deposited on the polymeric substrate.

The fluorine scavenger may be selected from the group consisting of boric acid, alkali metal borate, ammonium borate, boron anhydride, boron monoxide, aluminum chloride, metallic aluminum, aluminum oxide, and combinations thereof. In various embodiments, the fluorine scavenger comprises or consists of boric acid.

As will be explained below, depending on the type of oxide film to be formed on the polymeric substrate, the titanium tetrafluoride or the fluorine-containing titanium complex or the fluorine-containing silicon complex, or their combination in various proportions may be present in the aqueous mixture.

In various embodiments, the oxide film is a titanium oxide film. The titanium oxide of the titanium oxide film may have general formula $TiO_x$, wherein $0<x\leq2$. In various embodiments, the titanium oxide film comprises titanium dioxide ($TiO_2$), which is a clear form of titanium oxide. Traces of TiO, which is colored, may nevertheless be present in the titanium oxide film.

To form a titanium oxide film, the aqueous mixture may comprise titanium tetrafluoride and/or the fluorine-containing titanium complex only, and the fluorine-containing silicon complex may not be present. The aqueous mixture may contain one of, or both the titanium tetrafluoride and the fluorine-containing titanium complex. In some embodiments, the aqueous mixture may comprise the fluorine-containing titanium complex only, and titanium tetrafluoride and the fluorine-containing silicon complex may not be present. Examples of fluorine-containing titanium complex that may be used have already been mentioned above. In specific embodiments, the fluorine-containing titanium complex comprises or consists of ($NH_4)_2TiF_6$.

The titanium oxide film may be optionally doped with niobium (Nb) or silicon (Si). By the term "doped", it refers to an additive or element which is added to a material in low concentrations to alter a physical or chemical property of the material. Niobium and/or silicon may be added to the titanium oxide film so as to control growth of the titanium oxide film. Advantageously, presence of niobium and/or silicon renders a more controllable and reproducible growth of the titanium oxide film.

In various embodiments, the titanium oxide film is a Nb-doped titanium oxide film. The Nb-doped titanium oxide film may be denoted by Nb—$TiO_x$. To form the Nb-doped titanium oxide film, a niobium salt may be added to the aqueous mixture so that the aqueous mixture comprising titanium tetrafluoride and/or a fluorine-containing titanium complex and a fluorine scavenger further comprises the niobium salt. The aqueous mixture may then be contacted with the layer of polyalkoxysilane on the polymeric substrate.

Generally, any niobium salt that is at least partially soluble in an aqueous solution may be used. Examples of niobium salt that may be used include, but are not limited to, a niobium halide such as niobium chloride, niobium fluoride, niobium bromide, niobium iodide, niobium oxyfluoride, niobium oxychloride, niobium oxybromide, and/or niobium oxyiodide; niobium phosphate, niobium hydride, niobium nitride, niobium oxynitride, niobium boride, niobium carbide, niobium oxycarbide, niobium phosphide, niobium sulphide, or combinations thereof.

In various embodiments, the niobium salt is a niobium halide such as niobium chloride, niobium fluoride, niobium bromide, and/or niobium iodide. In specific embodiments, the niobium salt comprises or consists of $NbCl_5$.

In various embodiments, the titanium oxide film is a Si-doped titanium oxide film. The Si-doped titanium oxide film may be denoted by Si—$TiO_x$. To form the Si-doped titanium oxide film, the aqueous mixture may comprise at least one of titanium tetrafluoride or a fluorine-containing titanium complex, and a fluorine-containing silicon complex. The aqueous mixture may contain one of, or both the titanium tetrafluoride and the fluorine-containing titanium complex, and the fluorine-containing silicon complex. The at least one of titanium tetrafluoride or fluorine-containing titanium complex, and the fluorine-containing silicon complex may be present in the aqueous mixture, such that atomic ratio of the fluorine-containing silicon complex to the combination of titanium tetrafluoride and fluorine-containing titanium complex in the aqueous mixture is less than 0.6.

The fluorine-containing titanium complex may, for example, comprise or consist of $(NH_4)_2TiF_6$, and the fluorine-containing silicon complex may comprise or consist of $(NH_4)_2SiF_6$.

In various embodiments, ratio of the fluorine-containing silicon complex to the combination of titanium tetrafluoride and the fluorine-containing titanium complex in the aqueous mixture is in the range of about 0.05 to about 0.58, such as about 0.1 to about 0.58, about 0.2 to about 0.58, about 0.3 to about 0.58, about 0.4 to about 0.58, about 0.1 to about 0.5, about 0.1 to about 0.4, about 0.1 to about 0.3, about 0.15 to about 0.45, about 0.2 to about 0.4, or about 0.3 to about 0.4.

In forming the Si-doped titanium oxide film, Si atoms may displace Ti in the titanium oxide film, and Si in the Si-doped titanium oxide film may be present such that atomic ratio of Si to Ti (Si/Ti) in the Si-doped titanium oxide film is in the range of about 10% to about 15%. In various embodiments, atomic ratio of Si in the Si-doped titanium oxide film is in the range of about 12% to about 15%, about 13% to about 15%, about 10% to about 14%, about 10% to about 13%, about 11% to about 14%, or about 12% to about 14%.

An acidic solution may be added to the aqueous mixture, so as to render pH of the composition in the acidic range, defined herein as a pH that is less than 7. In various embodiments, pH of the aqueous mixture comprising the acid is in the pH range of about 1 to about 5, such as about 1 to about 4, about 1 to about 3, about 2 to about 4, about 1, about 2 or about 3. Examples of acidic solutions that may be used include, but are not limited to, hydrochloric acid, sulphuric acid, phosphoric acid, nitric acid, and combinations thereof. In specific embodiments, the acidic solution comprises or consists of hydrochloric acid.

The titanium oxide film that is obtained using a method disclosed herein is at least substantially amorphous. The term "amorphous" as used herein refers to a solid material that does not exhibit long-range crystalline order and/or has no substantial crystal lattice structure. In various embodiments, the titanium oxide film is non-crystalline. The titanium oxide film may be at least substantially amorphous or is amorphous. In various embodiments, the titanium oxide film is amorphous. This contrasts with state of the art self-cleaning coatings, which are based on the crystalline form of $TiO_2$ known as anatase.

The titanium oxide film may be photocatalytically active. As used herein, the term "photocatalytically active" refers to ability of a material to exhibit catalytic activity upon irradiation with light such as ultraviolet rays, and preferably, to ability of a material to degrade various organic and inorganic compounds by utilizing oxidation power induced by ultraviolet light (electromagnetic radiation with a wavelength between 100 and 400 nm) and/or visible light (electromagnetic radiation with a wavelength between 400 and 760 nm) energy. Advantageously, by coating a surface with a titanium oxide film disclosed herein, organic compounds such as methyl orange and methylene blue, or substances which may cause stain such as sweat (of which stearic acid is a component) that may be present on the surface may be degraded by irradiating UV light on the surface due to photocatalytic activity of the titanium oxide film. In so doing, this may serve to sterilize a surface having the titanium oxide film coated thereon.

Advantageously, the titanium oxide film formed using a method disclosed herein is multi-functional as it is able to exhibit transparency, superhydrophilicity, and/or photocatalytic activity. These attributes render the titanium oxide film suitable for use in various optical applications due to its transparency. The film may also be anti-fogging and ultra-wetting due to its superhydrophilicity. As photocatalytic activation or UV illumination is not required to activate superhydrophilicity of the films, this renders the titanium oxide film suitable for night time and low-light, indoor use. Furthermore, the film may be self-cleaning, odor degrading, and sterilizing due to its photocatalytic activity.

Apart from the above-mentioned, a silicon oxide film may also be prepared by a method disclosed herein. In various embodiments, the oxide film is a silicon oxide film. The silicon oxide of the silicon oxide film is generally in the form of silicon dioxide. In various embodiments, the silicon oxide is silicon dioxide ($SiO_2$). Advantageously, silicon dioxide possesses excellent chemical stability and good optical transmittance with low refractive index, which renders its suitability in various applications, such as in electronic devices as a passivating layer, and as anti-reflective coatings for display.

In various embodiments, the silicon oxide consists essentially of, or consists only of silicon dioxide ($SiO_2$). By the term "consists essentially", this means that the silicon oxide layer may contain trace amounts of other substances, which may arise, for example, from the preparation process. The trace amounts of other substances may be present in an amount of less than 5 atomic %, such as less than 2 atomic %, preferably less than 1 atomic %, even more preferably less than 0.5 atomic %.

To form the silicon oxide film, the aqueous mixture may comprise the fluorine-containing silicon complex only, and both the titanium tetrafluoride and the fluorine-containing titanium complex may not be present. Examples of fluorine-containing silicon complex that may be used have already been described above. In specific embodiments, the fluorine-containing silicon complex comprises or consists of $(NH_4)_2SiF_6$ Concentration of fluorine-containing silicon complex in the aqueous mixture may be in the range of about 0.1 M to about 0.2 M. For example, concentration of fluorine-containing silicon complex in the aqueous mixture may be in the range of about 0.12 M to about 0.2 M, about 0.14 M to about 0.2 M, about 0.16 M to about 0.2 M, about 0.18 M to about 0.2 M, about 0.1 M to about 0.18 M, about 0.1 M to about 0.16 M, about 0.12 M to about 0.18 M, or about 0.14 M to about 0.16 M.

Concentration of fluorine scavenger in the aqueous mixture may be in the range of about 0.2 M to about 0.6 M. For example, concentration of fluorine scavenger in the aqueous mixture may be in the range of about 0.3 M to about 0.6 M, about 0.4 M to about 0.6 M, about 0.5 M to about 0.6 M, about 0.2 M to about 0.5 M, about 0.2 M to about 0.4 M, about 0.2 M to about 0.3 M, about 0.25 M to about 0.5 M, or about 0.35 M to about 0.55 M.

In various embodiments, to form the silicon oxide film, the aqueous mixture may comprise at least one of the titanium tetrafluoride or the fluorine-containing titanium complex, and the fluorine-containing silicon complex. The aqueous mixture may contain one of, or both the titanium tetrafluoride and the fluorine-containing titanium complex, and the fluorine-containing silicon complex. In some embodiments, the aqueous mixture may comprise the fluorine-containing titanium complex and the fluorine-containing silicon complex. In such embodiments, atomic ratio of the fluorine-containing silicon complex to the combination of titanium tetrafluoride and the fluorine-containing titanium complex in the aqueous mixture is 0.6 or more. It has been surprisingly found by the inventors that a silicon oxide film, instead of a composite silicon oxide-titanium oxide film, may be formed using a titanium tetrafluoride and/or fluorine-containing titanium complex, and a fluorine-containing silicon complex in combination.

Examples of suitable fluorine-containing titanium complex and fluorine-containing silicon complex that may be used have already been described above.

In various embodiments, the fluorine-containing titanium complex may comprise or consist of $(NH_4)_2TiF_6$, and the fluorine-containing silicon complex may comprise or consist of $(NH_4)_2SiF_6$.

In specific embodiments wherein the fluorine-containing titanium complex is $(NH_4)_2TiF_6$ and the fluorine-containing silicon complex is $(NH_4)_2SiF_6$, concentration of $(NH_4)_2TiF_6$ and $(NH_4)_2SiF_6$ in the aqueous mixture may respectively be about 0.1 M.

To form the oxide film on the polymeric substrate, contacting the layer of the polyalkoxysilane on the polymeric substrate with the aqueous mixture is carried out at a temperature of less than 100° C. For example, contacting the layer of the polyalkoxysilane on the polymeric substrate with the aqueous mixture may be carried out at a temperature in the range of about 60° C. to about 90° C., such as about 70° C. to about 90° C., about 80° C. to about 90° C., about 60° C. to about 80° C., about 60° C. to about 70° C., about 65° C. to about 85° C., about 70° C., about 80° C., about 60° C. or about 90° C. In specific embodiments, contacting the layer of the polyalkoxysilane on the polymeric substrate with the aqueous mixture is carried out at a temperature of in the range of about 60° C. to about 90° C. to obtain the oxide film on the polymeric substrate.

For example, contacting the layer of the polyalkoxysilane on the polymeric substrate with the aqueous mixture may be carried out at 60° C. to form $Nb—TiO_x$ and/or $Si—TiO_x$ films. As another example, contacting the layer of the polyalkoxysilane on the polymeric substrate with the aqueous mixture may be carried out at 60° C. or 90° C. to form $SiO_2$ films.

Contacting the layer of the polyalkoxysilane on the polymeric substrate with the aqueous mixture may be carried out for any suitable time period that is sufficient to obtain the oxide film. The time period may depend on the titanium tetrafluoride and/or the fluorine-containing titanium complex and/or the fluorine-containing silicon complex used, as well as temperature at which the layer of the polyalkoxysilane on the polymeric substrate is contacted with the aqueous mixture. If lower temperatures are used, for example, a longer contacting time to grow or to form the oxide film may be required. By controlling the contacting time, thickness of oxide film that is formed on the polymeric substrate may be controlled.

In various embodiments, contacting the layer of the polyalkoxysilane on the polymeric substrate with the aqueous mixture is carried out for a time period in the range of about 2 hours to about 24 hours, such as about 4 hours to about 24 hours, about 6 hours to about 24 hours, about 12 hours to about 24 hours, about 18 hours to about 24 hours, about 2 hours to about 18 hours, about 2 hours to about 12 hours, about 2 hours to about 6 hours, about 4 hours to about 18 hours, about 4 hours to about 12 hours, about 2 hours to about 12 hours, about 2 hours to about 8 hours, about 2 hours to about 6 hours, or about 4 hours to about 6 hours.

Various embodiments refer in a second aspect to an oxide film prepared by a method according to the first aspect, wherein the oxide film is a titanium oxide film or a silicon oxide film.

As mentioned above, the oxide film disclosed herein is able to exhibit superhydrophilicity without requiring activation by UV excitation. As used herein, the term "superhydrophilic" refers to an attribute of a substrate whereby contact angle between a water droplet and a surface of the substrate is smaller than about 10°. For example, contact angle of the superhydrophilic coating disclosed herein may be smaller than 10°, such as smaller than 8°, smaller than 6°, or smaller than 5°.

This distinguishes from state of the art methods for preparing superhydrophilic coatings containing titanium oxide where photocatalytic activation or UV excitation is required. Removal of requirements for UV excitation translates into possible applications of the oxide films disclosed herein for night time and indoor use.

The titanium oxide film or silicon oxide film prepared by a method disclosed herein may respectively be made up of titanium oxide islands or silicon oxide islands. As used herein, the term "island" refers to a distinct area of a layer having a defined geometric shape that is protruding from the layer. In various embodiments, the oxide film is formed by an island growth mechanism, where the titanium oxide islands or silicon oxide islands on the substrate are capable of coalescing to form a continuous film.

Superhydrophilicity of the oxide film disclosed herein may be due to porous nature of the film. In various embodiments, the oxide film is mesoporous, as evidenced by its superhydrophilicity when freshly grown without any UV irradiation. According to IUPAC definition, mesopores have a size of between about 2 nm to about 50 nm. The mesopores may be defined by the titanium oxide islands or silicon oxide islands, and may be present in the form of spacing between the islands. In various embodiments, the pores are found between the islands or grains and may be about nm in size. The mesoporous film on the polymeric substrate may be rendered superhydrophilic due to wicking effect of the pores. Advantageously, the oxide film is highly transparent and superhydrophilic as-grown, meaning that post growth heat treatment is not required. Further, the use of porosity instead of UV radiation to render the films superhydrophilic means that this property may be active at night and at low sunlight conditions.

To regenerate the superhydrophilicity of oxide films that may arise due to contaminants, UV irradiation may be used, for example, by irradiating the oxide film with UV light having a wavelength in the range of about 250 nm to about 260 nm for about 5 to 10 minutes.

In some embodiments, percentage porosity of the oxide film is about 30%, which may mean that a significant amount of another functional material in nanosized form may be used to infiltrate, and be crystallized or precipitated in the pores.

For example, a metal phase may be precipitated in the titanium oxide films disclosed herein to form "secondary nanostructures" which aid in reflecting near-infrared (near-IR) radiation from the Sun (i.e. solar IR), while at the same time maintaining visible transparency of the film due to its nanoscale. These "secondary nanostructures" may be prevented from agglomerating by the pores which are located at the junction of the islands or grains. Further, such nanosized "secondary nanostructures" may also have a surface plasmon resonance effect which may enhance IR reflectivity.

In various embodiments, the mesoporous films may be infiltrated with molecules to release specific compounds such as fragrances or anti-bacterial vapor.

In various embodiments, the oxide film is optically transparent. In some embodiments, the oxide film may exhibit a transmittance of at least 70% in the wavelength region from 400 nm to 800 nm. The term "transmittance" as used herein refers to intensity of radiation transmitted through a material over that of the incident radiation, and which is expressed as a percentage. The wavelength region from 400 nm to 800 nm corresponds to visible light range of the electromagnetic spectrum. In various embodiments, the oxide film exhibits a transmittance of at least 70%, at least 75%, at least 80%, or at least 85% in the wavelength region from 400 nm to 800 nm.

Oxide films disclosed herein may be used in structures and products such as spectacle and camera lenses, phone, tablet and computer screens, displays, visors, safety goggles, mirrors, windshields, and glass curtain walls. Other applications may include buildings, anti-fouling coatings, self-cleaning surfaces, windows, and covers for cookware.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

Experimental Section

In various embodiments, a liquid phase deposition (LPD) technique was used to deposit superhydrophilic $TiO_x$-based and $SiO_2$-based films for self-cleaning on polycarbonate (PC) substrates. Polycarbonate has good chemical stability, low weight and cost, high mechanical strength, and excellent transparency, and has even been regarded as a replacement for glass. PC is widely used for handphone casings, glazings, domelights, sound proofing, automotive and aircraft windows, spectacles and safety goggles, bullet proof glass, and other security applications. Due to the hydrophobic nature of PC, however, it is difficult to deposit an oxide layer on PC using the water-based LPD method.

Basically, the LPD process involved slow hydrolysis of metal fluorine complex $[MF_n]_{m-n}$ with boric acid as the common fluorine scavenger. Using this method, crystalline metal oxide films may be obtained directly from aqueous solutions at low temperatures (25° C. to 100° C.). For example, the reaction may be conducted in a supersaturated chemical solution in which the substrate is simply immersed (60° C. growth temperature). This technique produces oxide films with good uniformity over large areas by immersing targeted substrates in a supersaturated chemical solution at low temperature.

For deposition of TiO$_2$ films using LPD, the chemical reactions involved include:

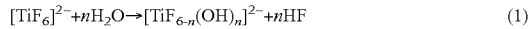

(1)

(2)

The fluoride ligand offers a slower and more controllable hydrolysis via control of the boric acid concentration as it acts as a scavenger. Silicon is added as (NH$_4$)$_2$SiF$_6$ (AHFSi) while niobium is added as NbCl$_5$.

Formation of crystalline SiO$_2$ films using LPD, on the other hand, involves a chemical equilibrium reaction between a metal fluoro-complex and a metal oxide in aqueous solution using aqueous precursors as shown in the following reactions:

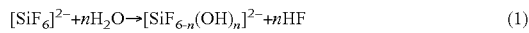

(1)

(2)

The fluoride ligand offers a slower and more controllable hydrolysis via control of the boric acid concentration as it acts as a F scavenger.

A self-assembled monolayer (SAM) was formed on the PC surface before the oxide film was deposited on the SAM layer by the LPD process at less than 100° C. In so doing, the SAM that is formed on PC acts as a modification layer to enhance nucleation for subsequent growth by LPD. This is different from state of the art methods where the surface of PC has to be treated to render the surface extremely hydrophilic before an oxide film may be deposited very uniformly on the PC surface.

In the case of TiO$_x$-based films, the TiO$_x$-based films obtained were fully or substantially amorphous. During LPD of TiO$_x$, some niobium (Nb) or silicon (Si) precursor were added into the growth solution which resulted in more controllable and reproducible growth of transparent and adherent oxide films. The freshly obtained films demonstrated natural superhydrophilic behaviors (i.e. no UV irradiation). Furthermore, the amorphous TiO$_x$-based films showed good activity for photodegradation of stearic acid (found in sweat) and methyl orange (a common textile dye). UV irradiation also restored superhydrophilicity of the film after the film surface was contaminated with organics from the environment.

In the case of SiO$_2$ films, the synthesized SiO$_2$ films were uniform and transparent. The nanoporous SiO$_2$ films exhibited the superhydrophilicity property in the absence of UV light irradiation.

It has also been shown herein that use of mixed silicon and titanium precursors may lead to the unexpected production of pure SiO$_2$ films.

Example 1: TiO$_x$-Based Films—SAM Deposition on PC

Polycarbonate (PC) sheets with 0.375 mm thickness were cut into 15 mm by 15 mm pieces. They were soaked in pH 2.0 hydrochloric acid (HCl) for 10 minutes to clean the surface, and subsequently rinsed with deionized (DI) water. After blow drying, the PC pieces were immersed in 1.0 vol % 3-aminopropyltriethoxysilane (APTES) in isopropanol for 10 minutes to allow SAM formation on the surface. Then the PC pieces were taken out and rinsed with isopropanol. Finally, they were baked at 100° C. for about 5 to 15 minutes.

Water contact angles of the films were measured to determine the hydrophilic property of the PC before and after SAM deposition. The initial spreading stage of a 3.0 μL, water droplet on the substrate is shown in FIG. 1. For bare PC and the SAM modified PC, the contact angle was measured to be 95.1° and 94.8°, respectively, clearly showing that the SAM layer does not make the substrate surface more hydrophilic.

Example 2: TiO$_x$-Based Films—Liquid Phase Deposition (LPD) of Niobium Doped TiO$_x$ Films (Nb—TiO$_x$) Film on SAM/PC Ti source is (NH$_4$)$_2$TiF$_6$ (AHFT), Si source is (NH$_4$)$_2$SiF$_6$ (AHFSi), and Nb source is NbCl$_5$.

A solution containing 0.025 M ammonium hexafluorotitanate, (NH$_4$)$_2$TiF$_6$ and 0.075 M boric acid was prepared by mixing solutions of (NH$_4$)$_2$TiF$_6$ and boric acid that had been separately prepared by dissolving the respective powders in water at pH 1.7 adjusted by adding HCl. To this solution, 10 mg of NbCL$_5$ was added and the mixed suspension was ultrasonicated for 10 minutes. To grow Nb—TiO$_x$ film, the SAM treated PC (SAM-PC) was suspended face down inside the deposition solution with the backside fully covered with a piece of Teflon tape to prevent deposition on the back. The sealed container was placed in a convection oven at 60° C. for 4 hours to carry out the reaction. The deposited films were then washed with deionized (DI) water and blown dry.

Figure 2:
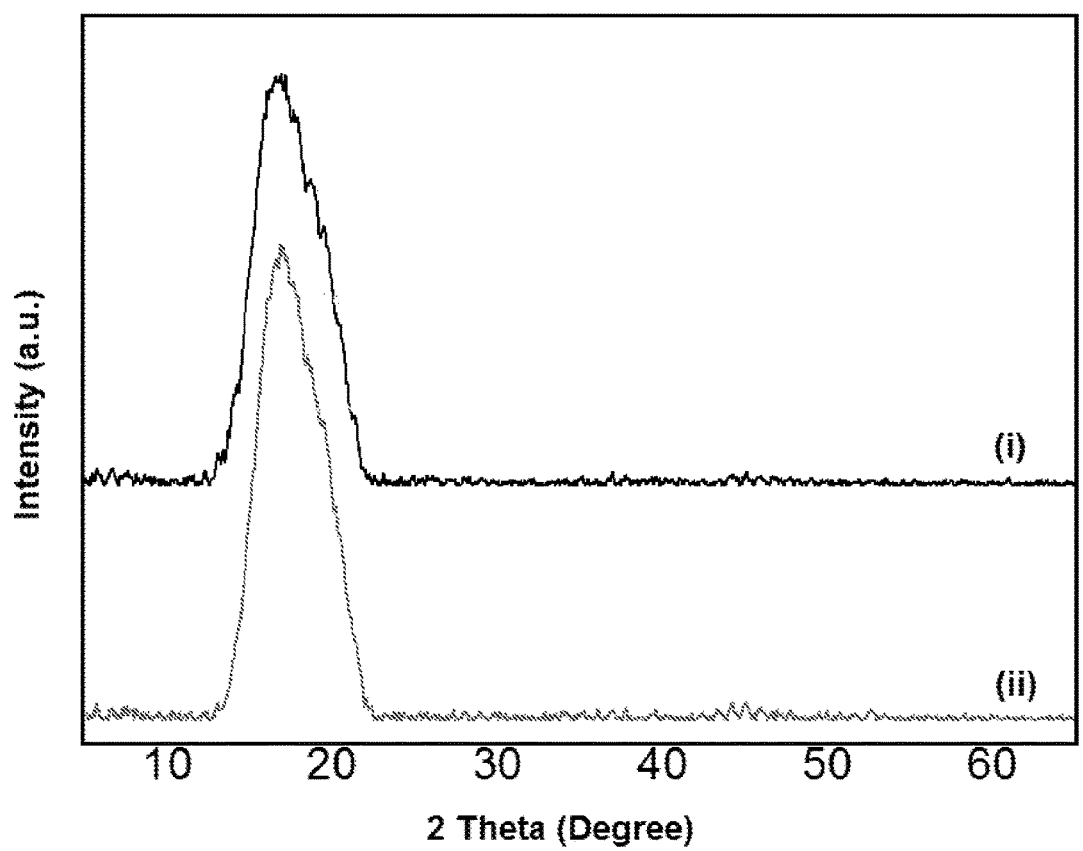
FIG. 2 shows X-ray powder diffraction (XRD) of (i) PC substrate, and (ii) Nb—$TiO_x$ film.
Figure 3:
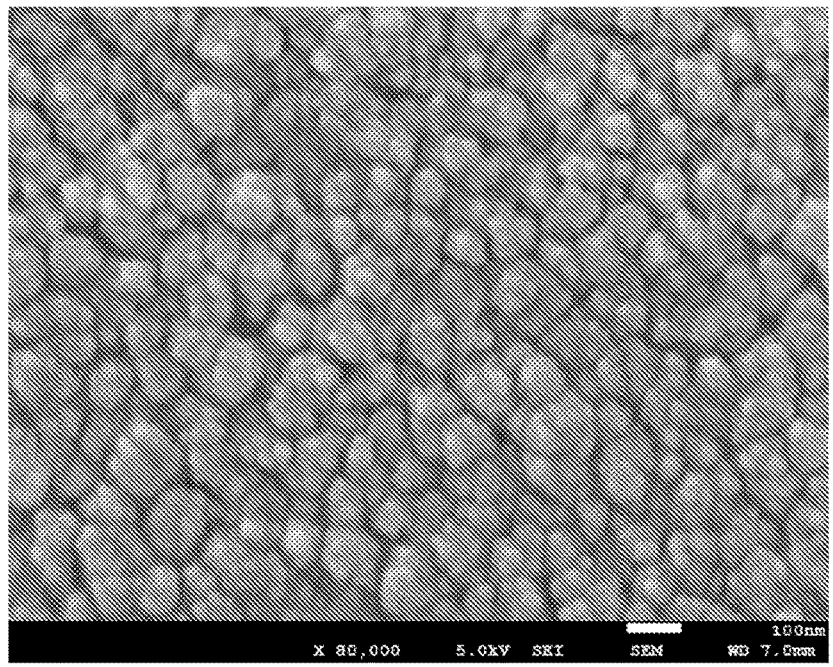
FIGS. 3(A) and (B) show Field Emission Scanning Electron Microscope (FESEM) images depicting surface morphologies at different magnifications of the Nb—$TiO_x$ films deposited on SAM/PC with thickness of 250 nm. Scale bar in (A) and (B) denotes 100 nm.
Figure 3:
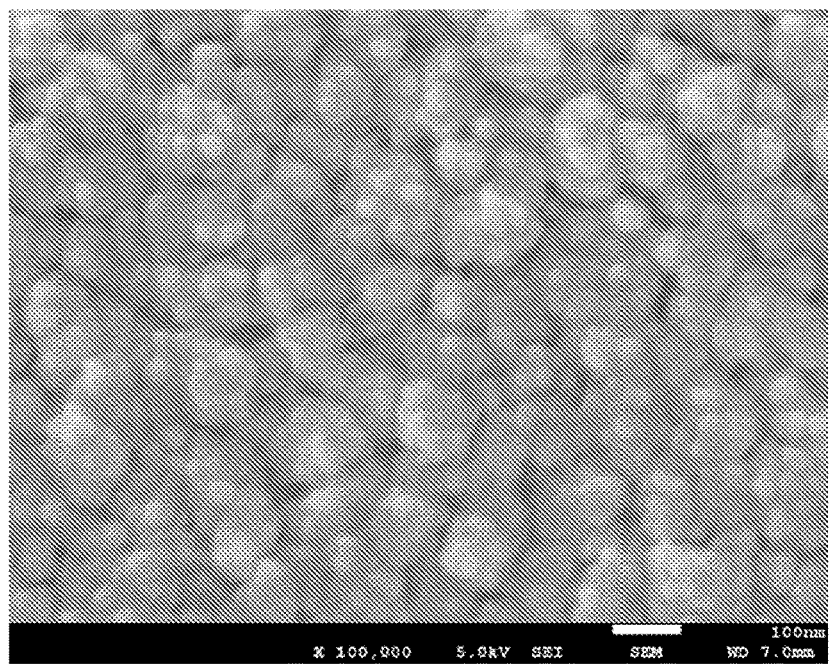

As shown in the X-ray diffraction (XRD) in FIG. 2, the as-grown film was amorphous while optical band gap measurements revealed a band gap of 3.21 eV, suggesting that the film may be a nanostructured film containing nanocrystalline TiO$_2$ within an amorphous matrix, in view that anatase TiO$_2$ has optical bandgap of about 3.2 eV. FIG. 3 showed that the film was nanostructured with nano-sized pores probably located between grains. Atomic force microscopy (AFM) measurements revealed a root mean squared roughness of 5.1 nm, while cross sectional scanning electron microscopy (SEM) showed a film thickness of 250 nm.

Figure 4:
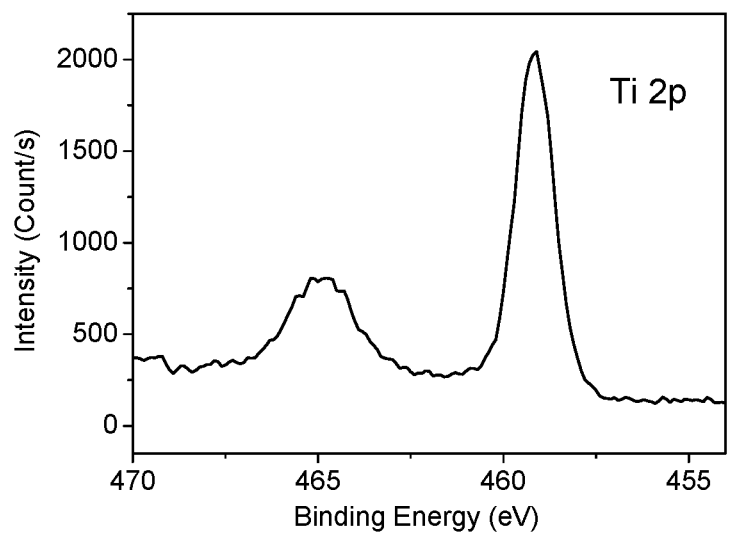
FIG. 4 shows X-ray photoelectron spectroscopy (XPS) spectra of Nb—$TiO_x$ film deposited on SAM-PC for (A) Ti2p, (B) O1s, (C) Nb3d, and (D) F1s.
Figure 4:
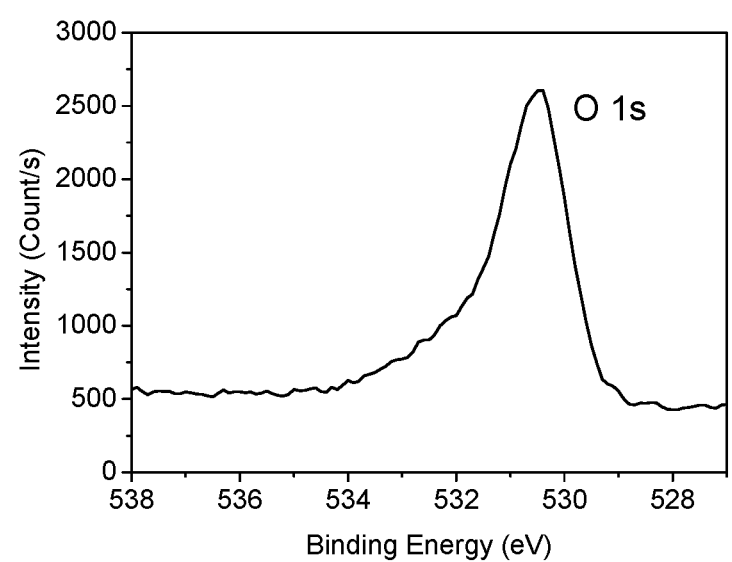
Figure 4:
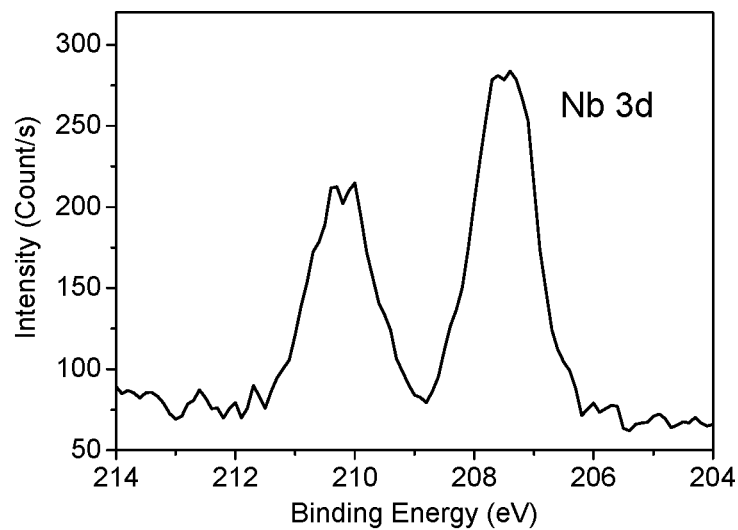
Figure 4:
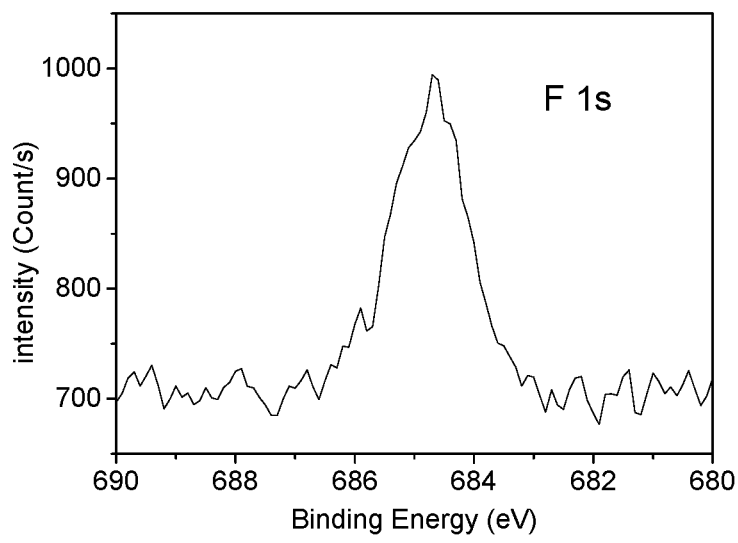

X-ray photoelectron spectroscopy (XPS) of the film (FIG. 4) showed binding energy peaks corresponding to the Ti2p, O1s, Nb3d and F1s electron orbitals, revealing atomic ratios of 22.9%, 69.3%, 2.8% and 4.9% respectively. The shoulder in the O1s peak was due to surface hydroxyls. The results confirmed the presence of Nb, Ti, O, F and H (as OH as seen in shoulder of O1s peak) in Nb—TiO$_x$ films.

Figure 5:
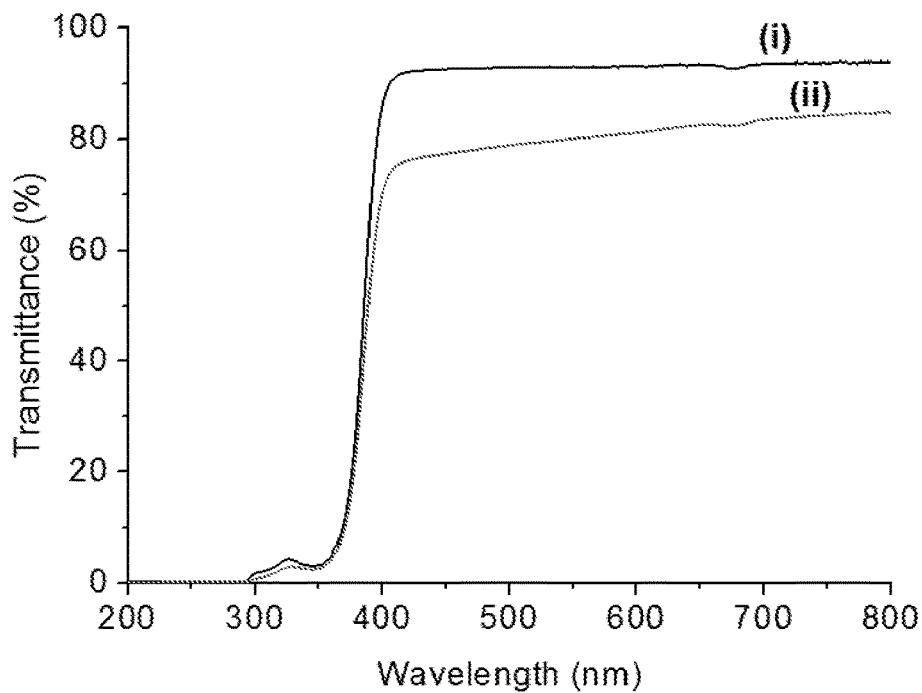
FIG. 5 shows UV-Vis transmission spectra of (i) PC substrate, and (ii) Nb—$TiO_x$ film.

The UV-Vis transmission spectra in FIG. 5 showed that the Nb—TiO$_x$ film on PC was transparent as-grown with a transmittance of greater than 70% in the visible range. This reduction in transmission would be useful for glazings and automotive windows, since it cuts down glare and the transmission of solar radiation from the Sun.

Variation of contact angle with time for the Nb—TiO$_x$ films was also measured (TABLE 1). As may be seen, the freshly prepared film was superhydrophilic as-grown, and this may be attributed to its mesoporous structure. Even after the contact angle increased as the film surface was contaminated by organics from the environment, superhydrophilicity may be restored by a simple UV exposure (intensity of 400 W/m$^2$, and wavelength of 254 nm) for 5 minutes. The recovery was repeatable.

TABLE 1

Variation of contact angle with time
for Nb—TiO$_x$ films grown on SAM-PC

| Date | Contact Angle |
|---|---|
| 29 Aug. 2013 (fresh) | Less than 5° |
| 30 Aug. 2013 | Less than 5° |
| 2 Sep. 2013 (4 days) | 42.1° |
| 5 Sep. 2013 (1 week) | 57.0° |
| 13 Sep. 2013 (2 weeks) | 88.4° |
| UV treatment | Less than 5° |
| 1 day | 9.4° |
| UV treatment | Less than 5° |
| 1 day | 9.0° |
| UV treatment | Less than 5° |
| 1 day | 9.5° |

Figure 6:
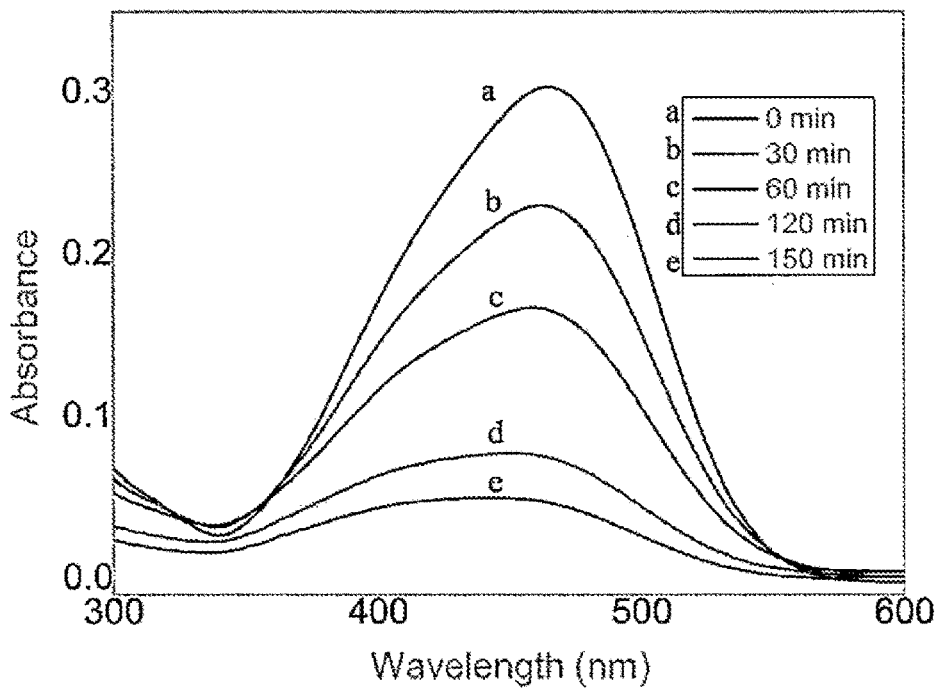
FIG. 6 is a graph depicting photodegradation of methyl orange by Nb—$TiO_x$ film when exposed to UV light for (a) 0 min, (b) 30 min, (c) 60 min, (d) 120 min, and (e) 150 min.

FIG. 6 is a graph depicting photodegradation of methyl orange by Nb—TiO$_x$ film when exposed to UV light. It shows that the Nb—TiO$_x$ film was also photocatalytically active, as it degraded methyl orange when irradiated with UV radiation (wavelength of 300 nm) having intensity of 7 mW/cm$^2$. This served as indication that the Nb—TiO$_x$ film may be used as a self cleaning film for surfaces that receive UV from sunlight.

Example 3: TiO$_x$-Based Films—LPD of Silicon Doped TiO$_x$ (Si—TiO$_x$) Film on SAM-PC Solutions containing 0.0075 M/0.015 M/0.0225 M AHFSi, 0.05 M AHFT (corresponding to an atomic AHFSi/AHFT ratio of 0.15, 0.30 and 0.45 respectively) and 0.15 M boric acid were prepared by combining the mixed AHFSi/AHFT solutions with boric acid which were separately prepared by dissolving the respective powders in water at pH 1.7 adjusted by adding HCl. To grow the Si—TiO$_x$ film, the SAM-PC was suspended face down inside the deposition solution with the backside fully covered with a piece of Teflon tape. The sealed container was placed in a convection oven at 60° C. for 6 hours to conduct the reaction. The grown films were then washed with DI water and blown dry.

Figure 7:
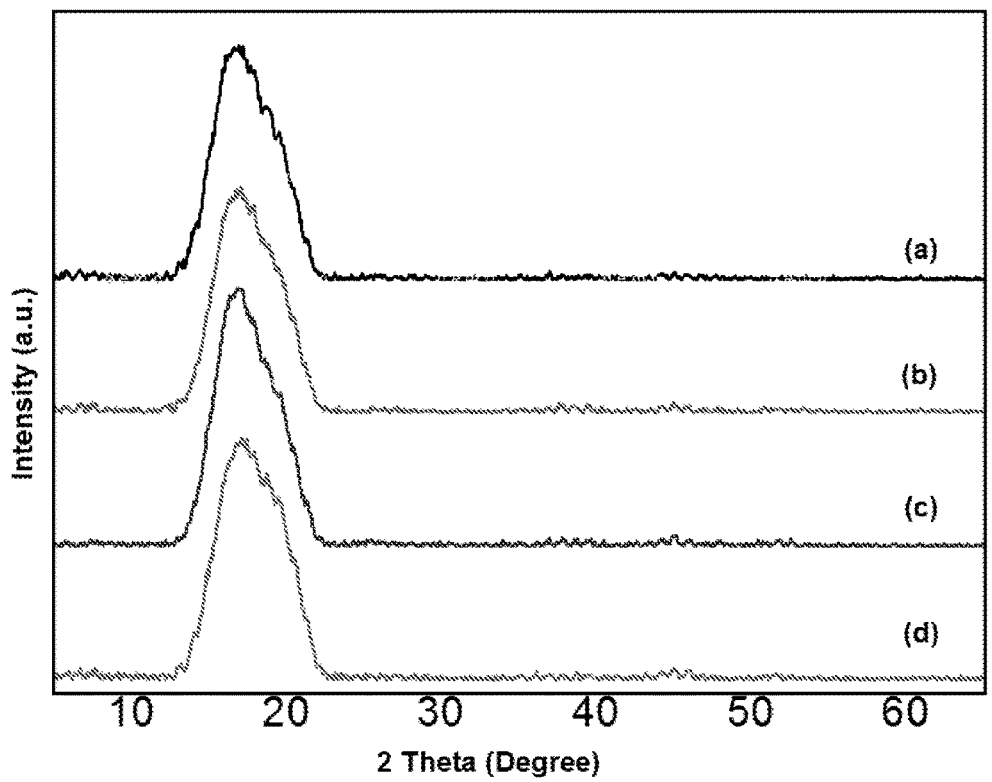
FIG. 7 is a graph showing XRD of (a) PC substrate, and Si—$TiO_x$ films grown at ammonium hexafluorosilicate/ammonium hexafluorotitanate (AHFSi/AHFT) ratios of (b) 0.15, (c) 0.30, and (d) 0.45.
Figure 8:
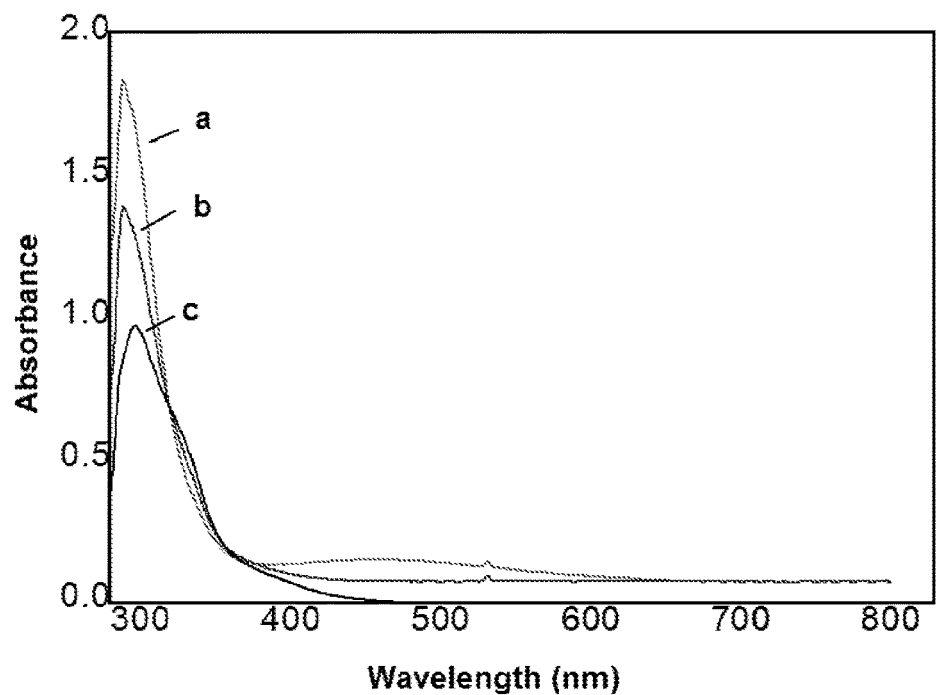
FIG. 8 is a graph showing absorption spectra of Si—$TiO_x$ films grown at AHFSi/AHFT ratios of (a) 0.15, (b) 0.30, and (c) 0.45.

X-ray powder diffraction (XRD) of the films, shown in FIG. 7, revealed that all films were amorphous but optical absorption measurements (FIG. 8) revealed that the optical band gaps varied between 3.18 eV and 3.23 eV, suggesting that the films may contain nanocrystalline regions within an amorphous matrix, in view that anatase TiO$_2$ has optical bandgap of about 3.2 eV. The film thickness decreased from 400 nm to 150 nm, and finally 100 nm as the AHFSi/AHFT ratio was increased from 0.15 to 0.45 indicating that the addition of AHFSi decreased the film growth rate.

X-ray photoelectron spectroscopy (XPS) of the Si—TiO$_x$ films revealed binding energy peaks corresponding to the Ti2p, Si2p, O1 s and F1 s electron orbitals. It confirmed presence of Si, Ti, O, F, and H in the Si—TiO$_x$ film. Quantitative analysis of the elements present in the film is listed in TABLE 2. It shows that Si may be incorporated up to a Si/Ti ratio of 10% to 15% only, as films grown for AHFSi/AHFT=0.6 led to films with very low levels of Ti incorporation.

TABLE 2

Elemental composition of Si—TiO$_x$ films by XPS.

| AHFSi/ AHFT | F (At. %) | O (At. %) | Si (At. %) | Ti (At. %) | Si/Ti (%) | Thickness (nm) |
|---|---|---|---|---|---|---|
| 0.15 | 14.79 | 62.52 | 2.73 | 19.95 | 13.7 | 400 |
| 0.30 | 3.89 | 69.33 | 2.88 | 23.90 | 12.0 | 150 |
| 0.45 | 4.00 | 70.52 | 2.48 | 22.99 | 10.8 | 100 |

Figure 9:
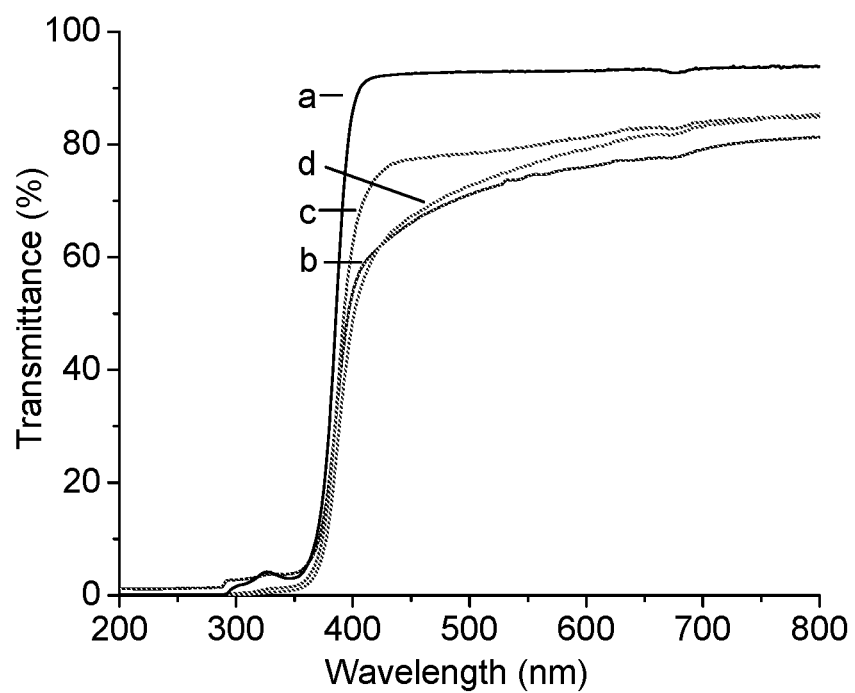
FIG. 9 is a graph showing UV-vis transmission spectra of (a) PC substrate, and Si—$TiO_x$ films for AHFSi/AHFT ratios of (b) 0.15, (c) 0.30, and (d) 0.45.

The UV-vis transmission spectra of the films in FIG. 9 showed that the Si—TiO$_x$ film on PC was transparent as-grown, whereby AHFSi/AHFTi=0.3 film had the best transparency in the visible range.

Figure 10:
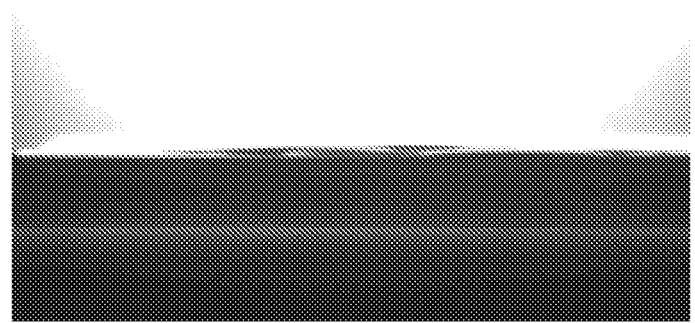
FIG. 10 shows water contact angle of Si—$TiO_x$ film for AHFSi/AHFT=0.30.

Water contact angles of all freshly prepared films revealed that a 3.0 µL water droplet on the film surface spread within milliseconds, and showed a contact angle of nearly zero (FIG. 10 depicts this for AHFSi/AHFT=0.30). The results showed that the freshly prepared film was superhydrophilic as-grown.

Variation of contact angles with time was also measured (TABLE 3). As can be seen, the contact angles increased gradually due to the adsorption of organic pollutants from the surroundings. The superhydrophilic behavior may, however, be restored by a simple UV cleaning treatment (intensity of 400 W/m$^2$ and wavelength of 254 nm for 5 min). The table also showed that this recovery was repeatable.

TABLE 3

Variation of contact angle with time
for Si—TiO$_x$ films grown on SAM-PC

| AHFSi/AHFT = 0.15 | | AHFSi/AHFT = 0.30 | | AHFSi/AHFT = 0.45 | |
|---|---|---|---|---|---|
| Days | Degree/° | Days | Degree/° | Days | Degree/° |
| Fresh | <5.0 | Fresh | <5.0 | Fresh | <5.0 |
| 8 | 8.6 | 8 | 8.2 | 3 | 8.1 |
| 19 | 32.8 | 19 | 61.2 | 24 | 57.6 |
| UV | <5.0 | UV | <5.0 | UV | <5.0 |
| 10 | 19.2 | 10 | 45.7 | 10 | 38.9 |
| 21 | 63.3 | 21 | 86.1 | 21 | 77.5 |
| UV | <5.0 | UV | <5.0 | UV | <5.0 |
| 1 | 8.5 | 1 | 8.9 | 1 | 8.2 |
| UV | <5.0 | UV | <5.0 | UV | <5.0 |
| 1 | 8.4 | 1 | 8.6 | 1 | 8.7 |
| UV | <5.0 | UV | <5.0 | UV | <5.0 |
| 1 | 9.0 | 1 | 9.1 | 1 | 9.7 |
| UV | <5.0 | UV | <5.0 | UV | <5.0 |
| 1 | 9.1 | 1 | 9.0 | 1 | 9.1 |
| UV | <5.0 | UV | <5.0 | UV | <5.0 |
| 1 | 9.6 | 1 | 9.4 | 1 | 9.6 |

The photocatalytic activity of the Si—TiO$_x$ films was tested by the photodegradation of stearic acid, $CH_3(CH_2)_{16}COOH$ and methyl orange. As degradation of stearic acid was monitored by measuring the integrated intensities of C—H stretching vibrations between 2700 cm$^{-1}$ and 3000 cm$^{-1}$, the inventors were not able to detect such C—H absorbance for the films deposited on PC since PC also had C—H bonds. Herein, using the same LPD method, the inventors grew the Si—TiO$_x$ film (for AHFSi/AHFT=0.15) on glass and then tested its activity towards photodegradation of stearic acid. To deposit the Si—TiO$_x$ film on glass, the glass substrate was first washed with piranha solution and DI water—no pretreatment with SAM was required.

The organic stearic acid film was cast on the film by applying 30 µL of 8.8×10$^{-3}$ M stearic acid in methanol on the film surface and spinning it at 1000 rpm for 2 min. A UV lamp (wavelength of 300 nm) with an intensity of 7 mW/cm$^2$ was used as the UV light source.

Figure 11:
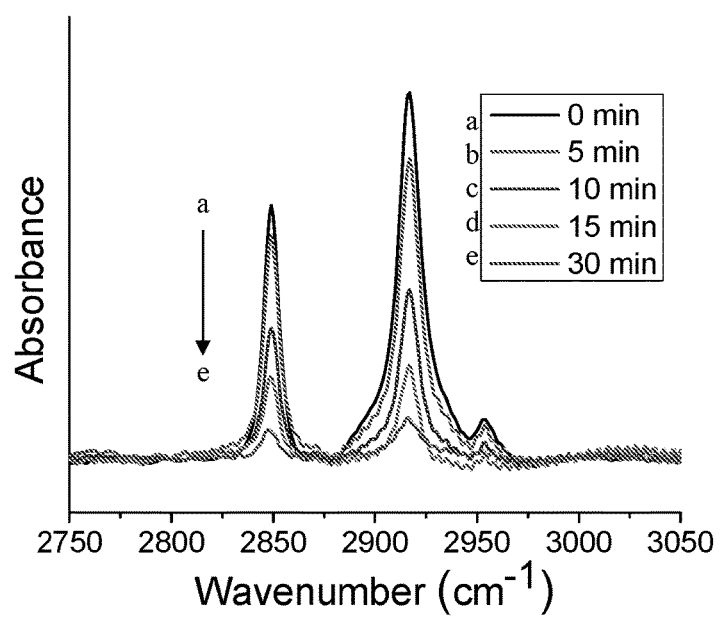
FIG. 11 is a graph depicting Fourier Transform Infrared (FTIR) spectra of photodegradation of stearic acid on Si—$TiO_x$ film (AHFSi/AHFT=0.15) deposited on glass substrate for (a) 0 min, (b) 5 min, (c) 10 min, (d) 15 min, and (e) 30 min.

FIG. 11 shows representative Fourier Transform Infrared (FTIR) spectra of the photodegradation of stearic acid on the film with times. 90% of the stearic acid decomposed within 30 min, indicating that the film had very good photoactivity.

Figure 12:
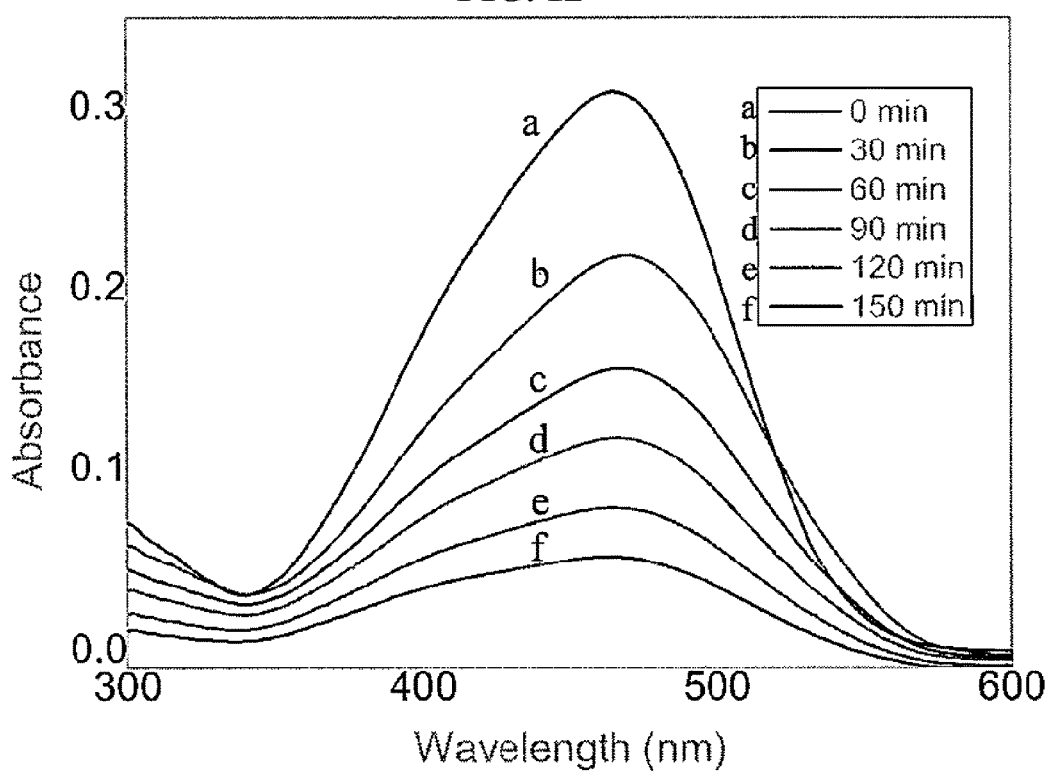
FIG. 12 is a graph depicting photodegradation of methyl orange by Si—$TiO_x$ film on PC for AHFSi/AHFT=0.15 when exposed to UV light for (a) 0 min, (b) 30 min, (c) 60 min, (d) 90 min, (e) 120 min, and (1) 150 min.

The photocatalytic activity of the films grown on PC were also tested with methyl orange and FIG. 12 shows the activity of the film grown for AHFSi/AHFT=0.15 when exposed to UV light (wavelength of 300 nm) with the intensity of 7 mW/cm$^2$ indicating that the Si—TiO$_x$ films may also be used as self cleaning films on surfaces exposed to sunlight.

Example 4: TiO$_x$-Based Films—Adhesion Test

Additionally, the inventors also conducted cross-cut adhesion tests on the films according to DIN EN ISO 2409. Firstly, each film was scratched in a grid pattern with a metal blade (6 lines in each orthogonal direction, 2 mm apart). A strip of scotch tape was firmly pressed on the film, and evenly pulled off within 1 s at 60° to the pull off direction. This was repeated 20 times for all the Nb—TiO$_x$ and Si—TiO$_x$ films.

Figure 13:
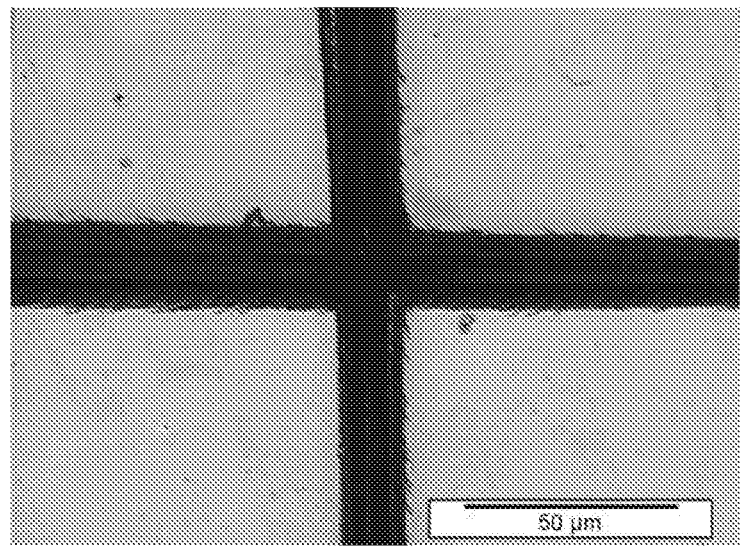
FIG. 13 shows optical micrographs for Si—$TiO_x$ films on PC after 20 successive scotch tape tests for (a) AHFSi/AHFT=0.15, and (b) AHFSi/AHFT=0.45. Scale bar in the figures represents 50 µm.
Figure 13:
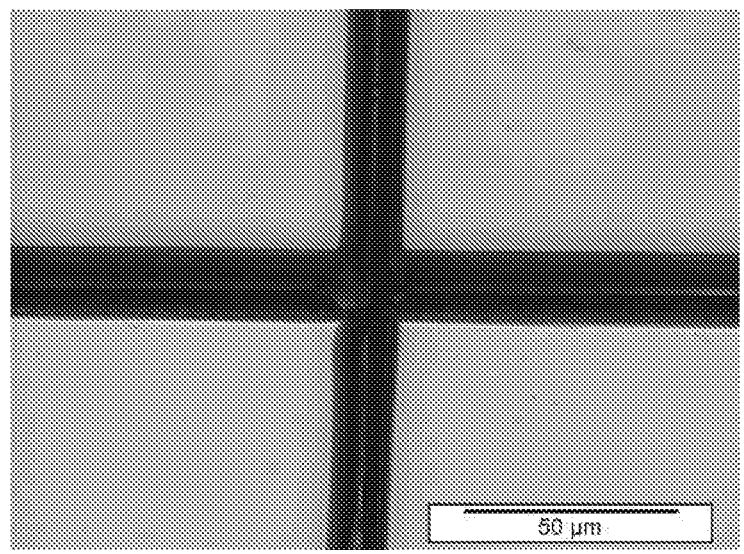

As shown in the optical micrograph in FIG. 13, and when compared to a standard reference as shown in FIG. 13(C), FIG. 13(A) shows how a film with a rating of 1 (very good adhesion) looks like, while FIG. 13(B) is for a film with a rating of zero (excellent adhesion). In general, Nb—TiO$_x$ film has excellent adhesion, while Si—TiO$_x$ film has very good to excellent adhesion. The Nb—TiO$_x$ and AHFSi/AHFT=0.30 films also have zero ratings.

As shown herein, the liquid phase deposition (LPD) technique was used to deposit photocatalytically active TiO$_x$-based films on PC substrates at less than 100° C. The surface of the polycarbonate (PC) is first modified with a self-assembled monolayer (SAM), heated at 100° C. followed by oxide film deposition by LPD.

Advantageously, present method according to embodiments is a simple method of pre-treating PC surfaces with APTES SAM that does not render the PC surface highly hydrophilic and does not require exposure to UV, oxygen (O$_2$) plasma, etching, oxidizing solution treatment or other chemical treatments to produce a highly hydrophilic surface on PC before film growth. Thus, the number and ease of PC surface pre-treatment is greatly simplified and more amenable to large area processing due to use of solution deposition. Rate of TiO$_2$ formation may be controlled by temperature, pH, concentration and AHFT/H$_3$BO$_3$ ratio, and the process is simple and scalable. The process is versatile, involving use of low temperature deposition and simple equipment, for example, without requiring use of a vacuum system for controlled environment, which result in low costs. The low growth temperatures of less than 100° C. also means that films may be formed on materials which are not able to withstand high temperatures such as plastic and organic substrates/surfaces.

Secondly, the TiO$_x$-based films were amorphous or mostly amorphous, and do not require high temperatures calcination/annealing for crystallization. This contrasts with applications which typically aspire to obtain the crystalline anatase form. Even though the films were amorphous or mostly amorphous, the films were photocatalytically active, which translates into ability to self-clean and anti-bacterial properties. The film also does not require the use, synthesis and storage of crystalline nanoparticles.

The films were superhydrophilic as-grown due to mesoporosity, and superhydrophilicity may be regained upon exposure to UV. Nb and/or Si were used to control film growth rate.

Potential applications include applications in which PC is used, such as consumer electronics as casings, windows, sound proofing, safety and security glass, and glazings; anti-fogging spectacle and camera lenses, windows, mirrors, goggles; applications which require self cleaning e.g. no ring stains from non-spreading droplets; car side view mirrors and windshields; anti-static coatings e.g. dust 'repellant'.

Example 5: SiO$_2$-Based Films—SAM Deposition on PC

A PC substrate was first cleaned by immersing in piranha solution (volume ratio 3 H$_2$SO$_4$:1 H$_2$O$_2$) or in HCl solution (pH 2) for 2 minutes to 5 minutes at room temperature. This was followed by cleaning with deionized (DI) water and blow drying. After blow drying, the PC pieces were immersed in 1.0 vol % 3-aminopropyltriethoxysilane (APTES) in isopropanol for 10 minutes to modify the surface with APTES, and allow the self-assembly monolayer (SAM) formation on their surface. Then, the PC pieces were taken out and rinsed with isopropanol. Finally, they were baked at 100° C. for about 5 to 15 minutes.

Figure 14:
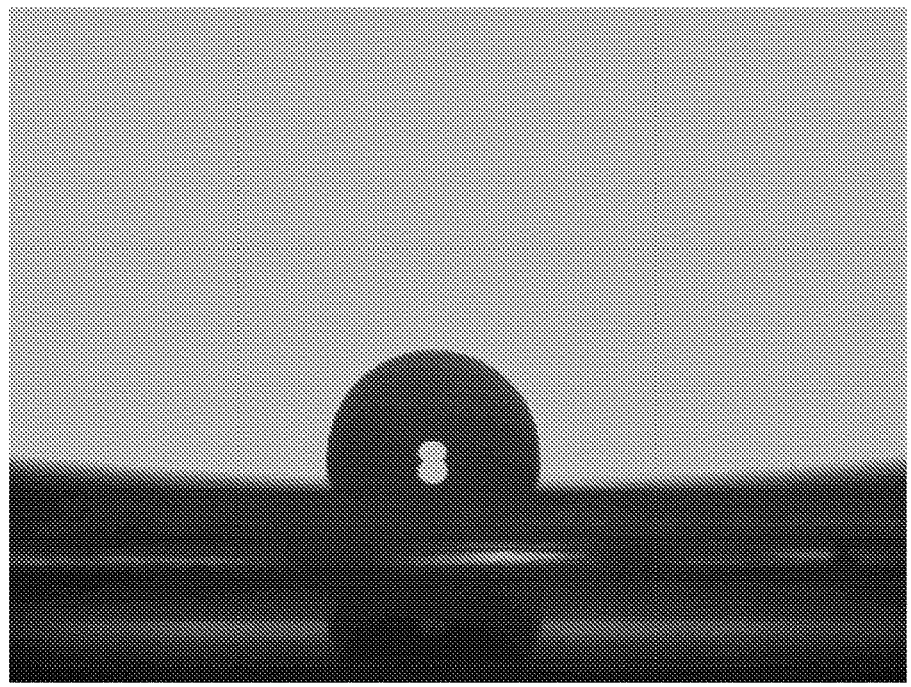
FIG. 14 shows water contact angle of (A) untreated PC, and (B) PC treated with SAM i.e. SAM-PC.
Figure 14:
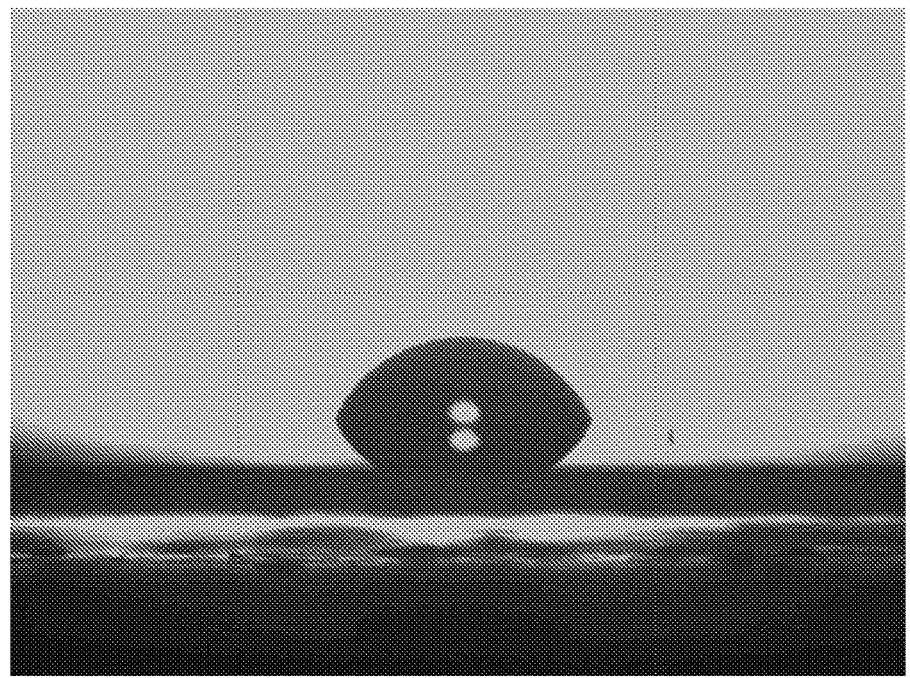

The wetting property of the treated and untreated PC was evaluated by examining the contact angle of water as shown in FIG. 14. Water droplets were gently deposited onto the surfaces with use of a micro-liter pipette, and a charge coupled device camera lens array system was used in order to capture the image of the droplet profiles. The water droplet had a volume of 2 µL. It was observed that the contact angle value for bare PC substrate in many cases with and without SAM coating were in the range of about 71° to about 94° and 71°, respectively. It was also observed in quite a number of cases for reasons still unknown that the contact angle hardly changes after SAM deposition. Even in such cases, SiO$_2$ films could still be grown whether using silicon containing precursors only or a mixture of silicon and titanium containing precursors.

Example 6: SiO$_2$-Based Films—Growing SiO$_2$ Films on SAM-PC Using Silicon Containing Precursors A growth solution containing about 0.1 M to about 0.2 M ammonium hexafluorosilicate, (NH$_4$)$_2$SiF$_6$, and about 0.2 M to about 0.6 M boric acid was prepared by mixing solutions of (NH$_4$)$_2$SiF$_6$ and boric acid which were separately prepared by dissolving the respective powders in water.

The modified PC surface (SAM-PC) was then suspended face down in the sealed container in the growth solution and placed in a convection oven at a temperature in the range of 40° C. to 90° C. for a time period of about 2 hours to about 24 hours. After the growth, the samples were washed with DI water and blown dry.

Figure 15:
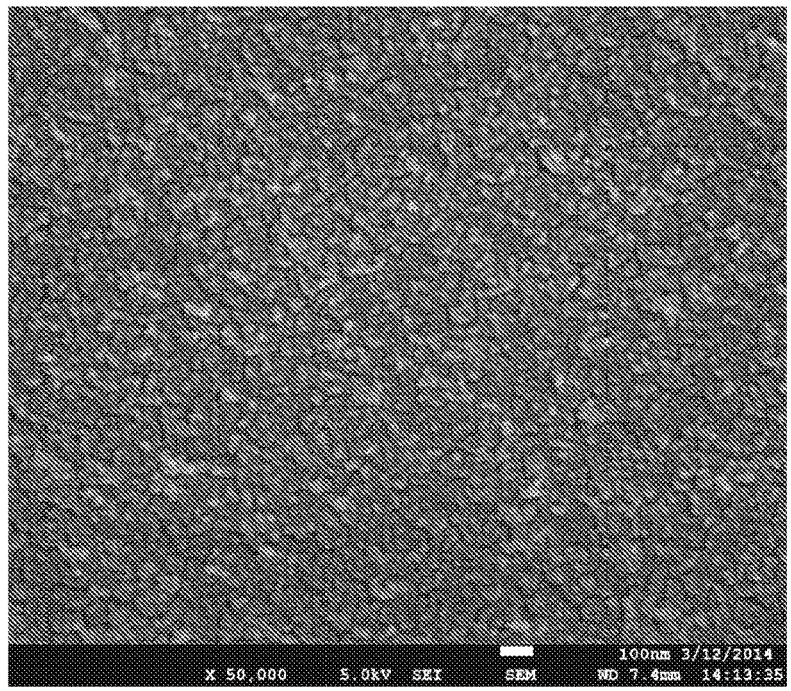
FIG. 15 shows surface morphology of $SiO_2$ grown on SAM-PC at fixed precursor solution conditions 0.1 M AHFSi 0.3 M $H_3BO_3$ with different growth times and temperatures: (A) 60° C. 4 hours; (B) 60° C. 16 hours; (C) 90° C. 1 hour; and (D) 90° C. 4 hours. Scale bar in the figures represents 100 nm.
Figure 15:
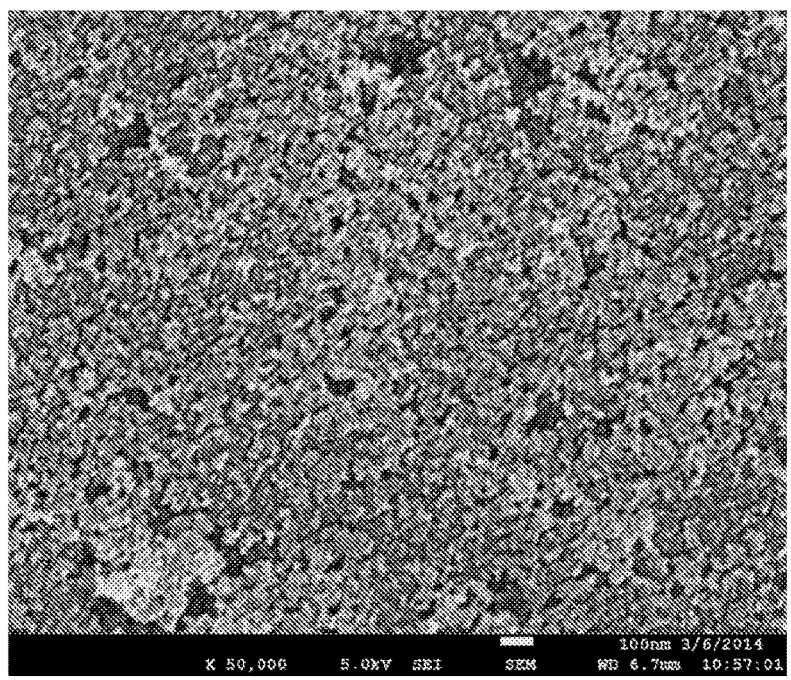
Figure 15:
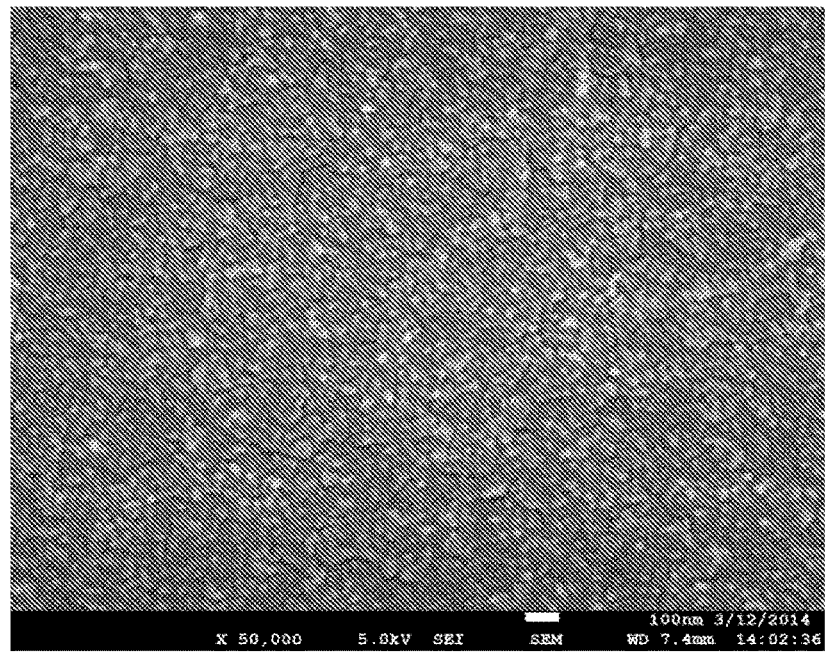
Figure 15:
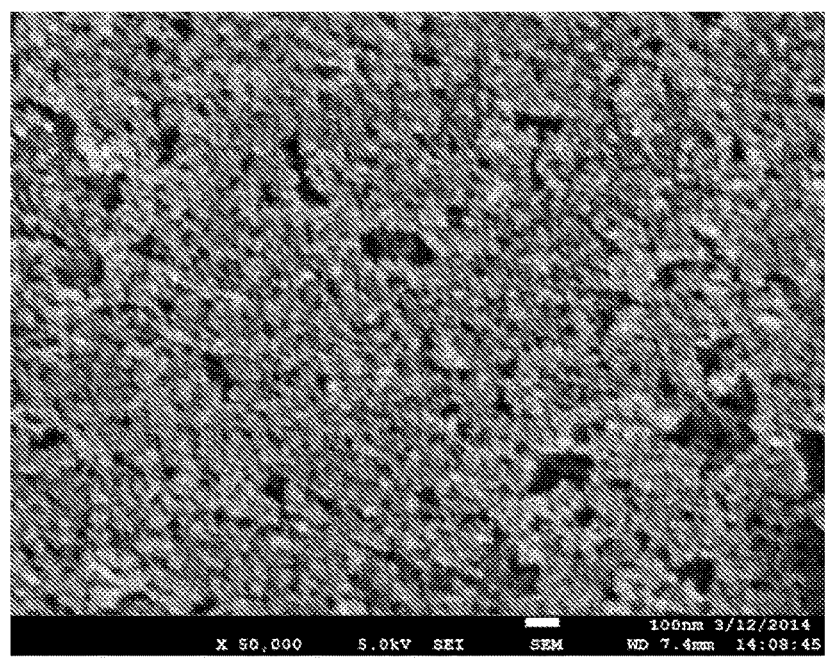
Figure 16:
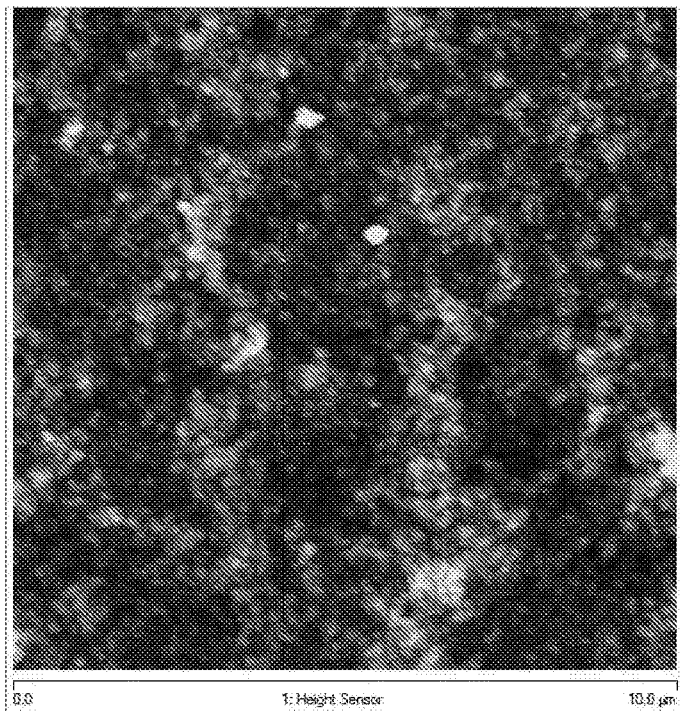
FIG. 16 shows atomic force microscopy (AFM) of surface morphology of $SiO_2$ films grown on PC grown at (A) 60° C. for 16 hours, and (B) at 90° C. for 4 hours.
Figure 16:
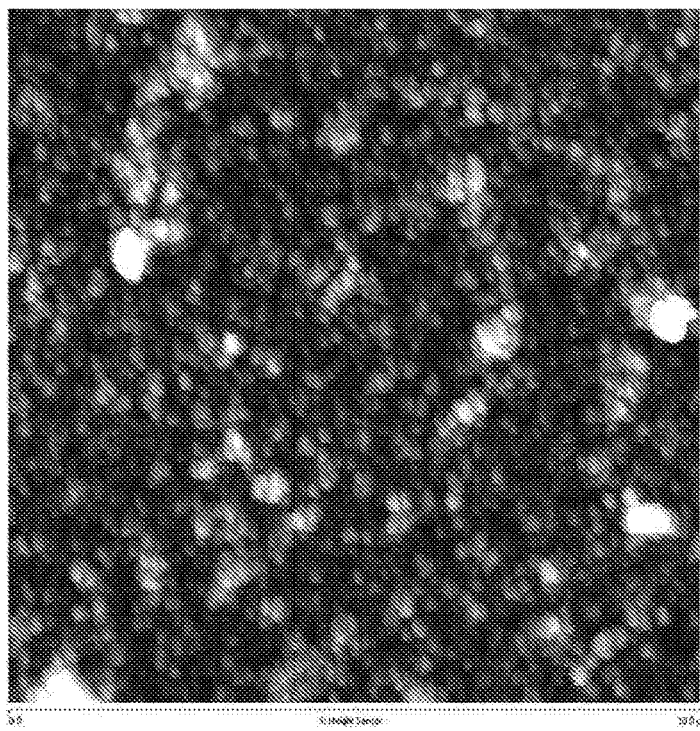

Rate of film formation can be controlled by temperature, pH, concentration and AHFSi/H$_3$BO$_3$ ratio—concentrations generally higher than for growth on glass. From surface morphology measurement (FIG. 15), growth time and temperature are among the key parameters to control the film formation and microstructure. It is seen that for the same precursor concentrations, the SiO$_2$ film showed smooth and fine particulate surface at low growth temperature or short growth time (FIGS. 15(A) and (C)). At higher growth temperature or longer growth time (FIGS. 15(B) and (D)), the film surface becomes rougher and more porous. SEM of film reveals nanoscale porosity. This observation is also consistent with the AFM results in FIG. 16. Surface roughness of the $SiO_2$ film on PC grown at 60° C. for 16 hours and at 90° C. for 4 hours was 21.4 nm and 23.5 nm root mean square roughness ($V_{rms}$) respectively.

Figure 17:
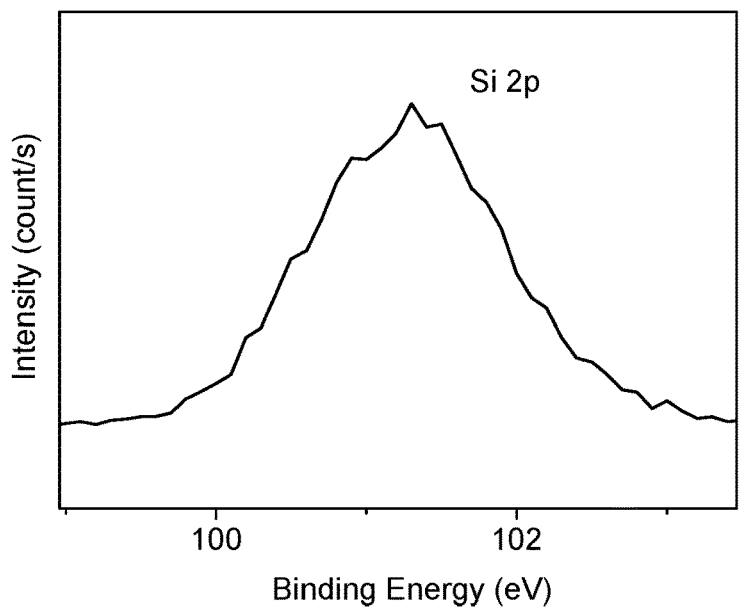
FIG. 17 shows XPS spectra of $SiO_2$ film deposited on SAM-PC grown using 0.1 M AHFSi, 0.3 M $H_3BO_3$ at 60° C. for 16 hours for (A) Si2p, and (B) O1s.
Figure 17:
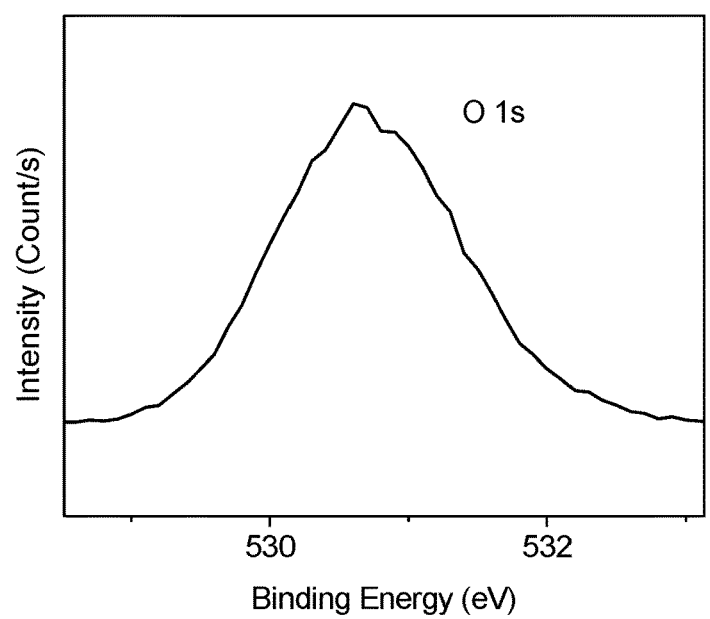

The chemical composition of the synthesized films at 60° C. for 16 hours was characterized by X-ray photoelectron spectroscopy (XPS), as shown in FIG. 17. The binding energy peaks correspond to the Si 2p, and O 1s electron orbital, and the Si and O have the atomic ratio of 34.74% and 65.26% respectively, indicating the formation of $SiO_2$ films on PC substrate. For the film synthesized at higher growth temperature (90° C. for 4 hrs), the atomic ratio of Si and O were 36.35% and 63.65%, respectively. There was no indication of fluorine, F, in the film, as is commonly observed for LPD $TiO_2$ films.

Figure 18:
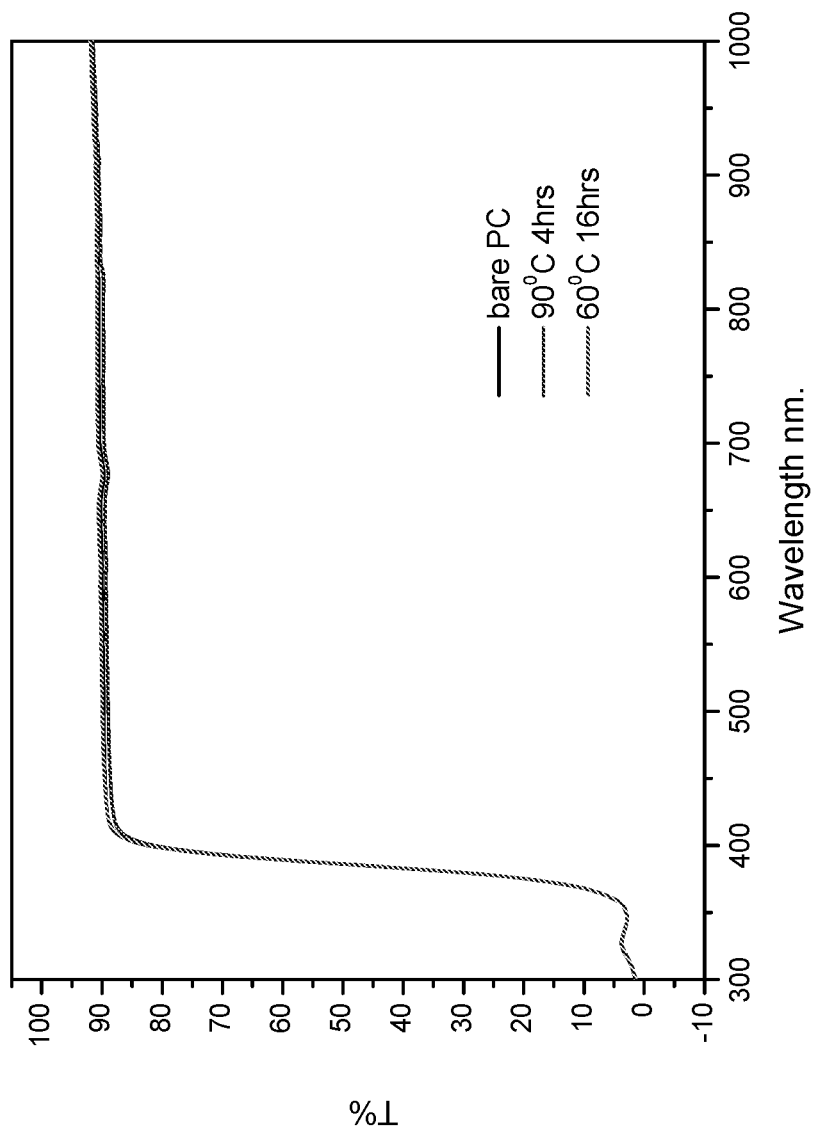
FIG. 18 shows UV-vis transmission of the $SiO_2$ films compared with uncoated PC.

FIG. 18 shows the transmittance of films grown at various growth temperatures on PC at the solution condition of 0.1 M AHFSi, 0.3 M $H_3BO_3$. The transparency of $SiO_2$ coated PC was almost the same as the PC substrate with a transmittance about 89% in the wavelength visible range of about 450 nm to about 800 nm. All the films retained a high level of transparency (about 85% to about 89%) indicating that the transmission level of PC was hardly affected by the coated $SiO_2$ films.

Figure 19:
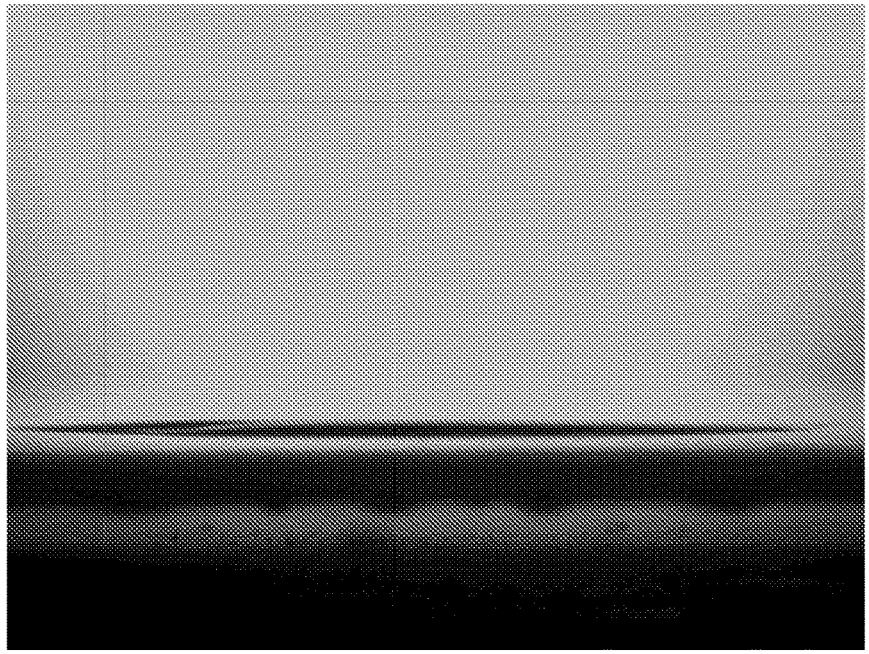
FIG. 19 shows water contact angle of $SiO_2$ coating on PC grown at (A) 60° C. for 16 hours, and (B) 90° C. for 4 hours.
Figure 19:
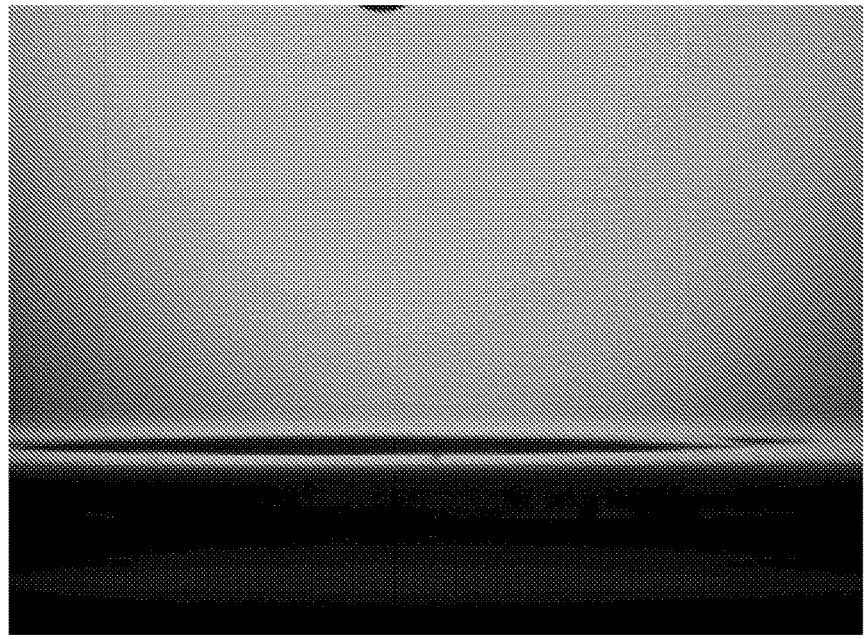

The superhydrophilic property of the film was evaluated by examining the contact angle of water as shown in FIG. 19. It was observed that the water droplet spreads within milliseconds on the as-grown film surface. As a consequence, the film exhibited nearly zero contact angle. UV irradiation was not applied to activate this superhydrophilic behavior.

To check the persistence of superhydrophilic property of $SiO_2$ films, they were exposed to air for long times with contact angle measurement made at given periods. The contact angle of a water droplet on the coated PC is shown in TABLE 4 as a function of elapsed time (after 10 days, 20 days, 30 days and 45 days).

TABLE 4

Variation of contact angle with time for $SiO_2$ film grown

| Time (days) | Contact angle value (degree) | |
| --- | --- | --- |
| | A | B |
| 0 (fresh) | <5 | <5 |
| 10 | 5 | <5 |
| 20 | 5 | 5 |
| 30 | 8 | 7 |
| 45 | 10.2 | 10 |

Growth condition: A—0.1 M AHFSi and 0.3 M $H_3BO_3$ at 60° C. for 16 hrs; B—0.1 M AHFSi and 3 M $H_3BO_3$ at 90° C. for 4 hrs.

As can be seen, the freshly prepared film has a contact angle less than 5°. After more than 1 month, the water droplet, having a volume of 2 μL, still spread within milliseconds on the film's surface and the contact angle value is still remain low at about 10°. As a result, the $SiO_2$ films still maintained their hydrophilic property. During these measurements, UV irradiation was not applied for the activation of the superhydrophilic behavior.

Figure 20:
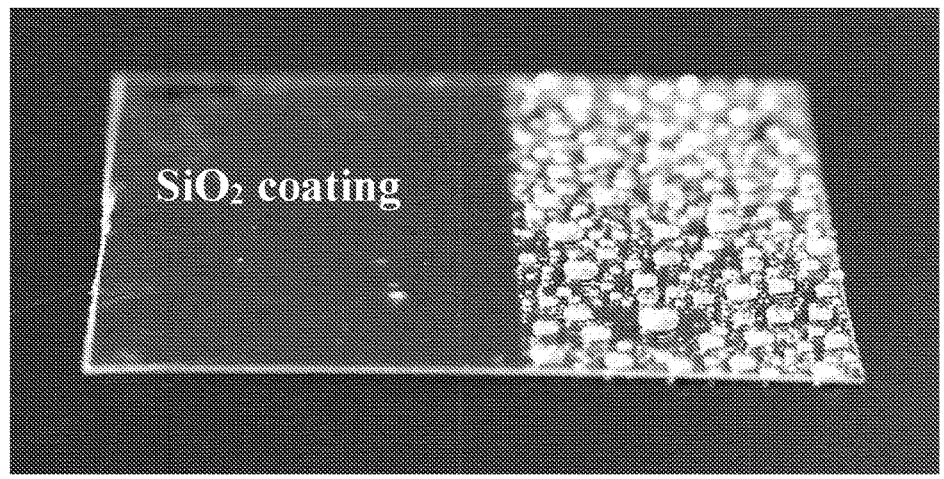
FIG. 20 shows images of PC substrates partially covered with $SiO_2$ coating after the water spray test: (A) growth condition A; and (B) growth condition B.
Figure 20:
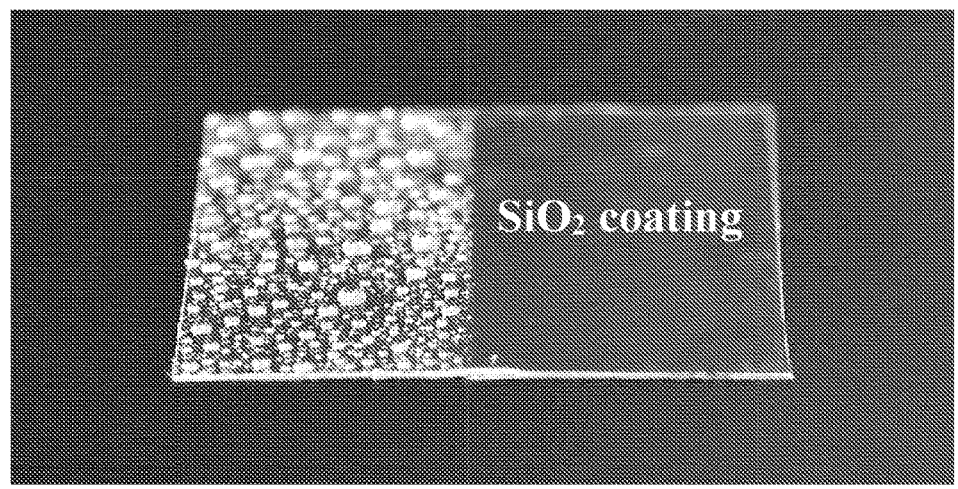

FIG. 20 illustrates the water spreading behavior of the $SiO_2$ coated PC. One half of the PC was covered with thermal tape before putting into the growth solution to prevent film growth on that half. After growth, the coated PC was sprayed with water. The coated part of the slide remained transparent while the uncoated part showed a lot of water droplets. This is consistent with the contact angle measurement (FIG. 19) of the $SiO_2$ coating which showed very low contact angle value (less than 5°) for the part covered with $SiO_2$ film and high value for the part with bare PC (FIG. 14).

Example 7: $SiO_2$-Based Films—Growing $SiO_2$ Films on SAM-PC Using Silicon and Titanium Containing Precursors Another approach to achieve $SiO_2$ film on PC is via LPD growth using a mixture of silicon and titanium containing precursors with a high ratio of Si/Ti (about 0.6 and above) in the precursors.

In the experiments carried out, Ti source used was $(NH_4)_2TiF_6$ (AHFT), and Si source used was $(NH_4)_2SiF_6$ (AHFSi).

In detail, the growth solutions containing 0.1 M AHFSi, 0.1 M AHFTi, and 0.15 M boric acid were prepared by combining the mixed AHFSi/AHFT solutions with boric acid that had been separately prepared by dissolving the respective powders in water. To grow the $SiO_2$ film, the SAM-PC was suspended face down inside the deposition solution. The sealed container was placed in a convection oven at 60° C. for 6 hours to conduct the reaction. The grown films were then washed with DI water and blown dry.

Figure 21:
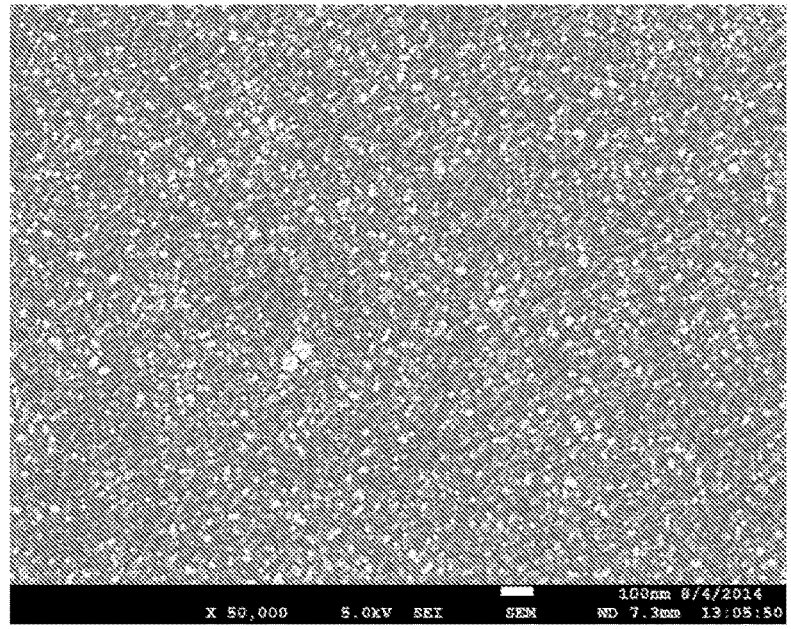
FIG. 21 shows surface morphology (SEM, AFM) of $SiO_2$ film on SAM-PC substrate with different precursor concentrations: (A,C) 0.05 M AHFSi, 0.05 M AHFT, 0.3 M $H_3BO_3$; (B,D) 0.1 M AHFSi, 0.1 M AHFT, 0.3 M $H_3BO_3$.
Figure 21:
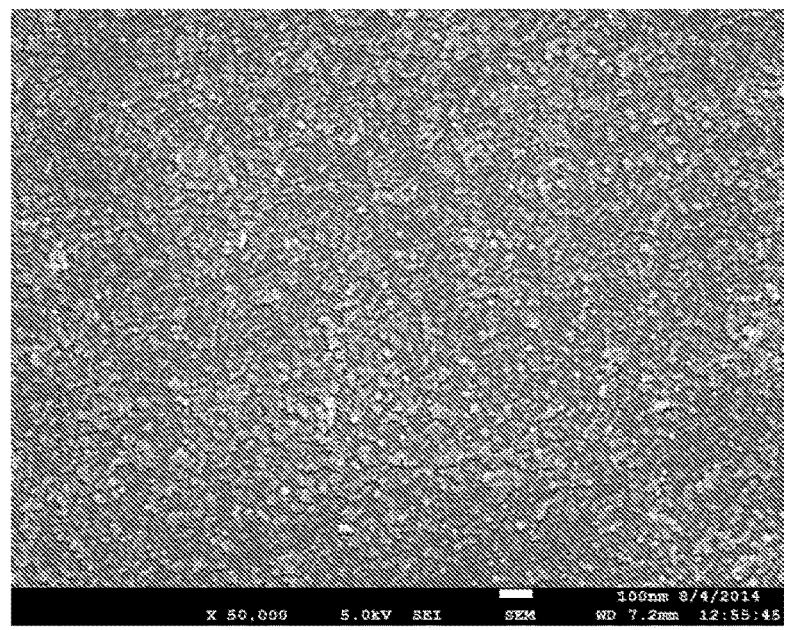
Figure 21:
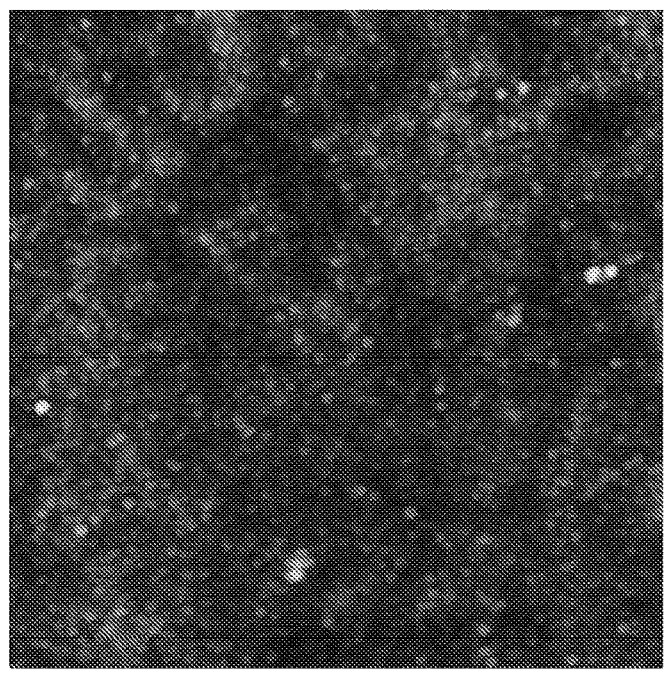
Figure 21:
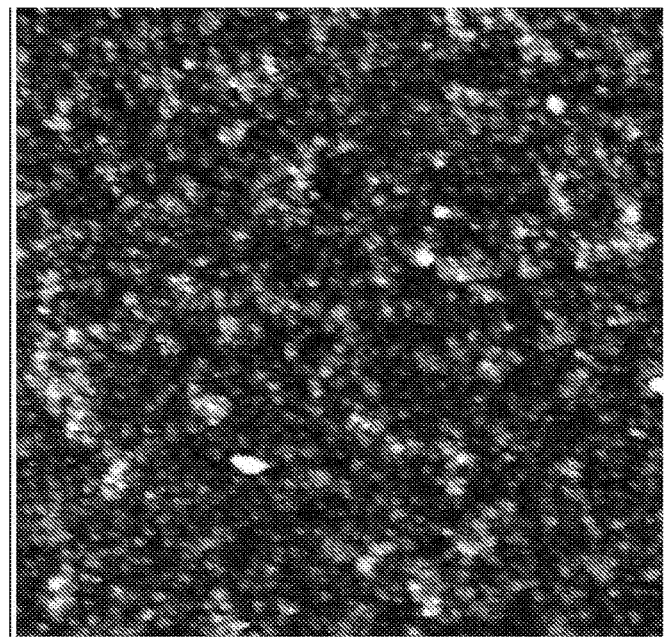

FIG. 21 shows the surface morphology of the $SiO_2$ film grown on SAM-PC with different concentrations of AHFSi, AHFT and $H_3BO_3$. After 6 hours growth at 60° C., the film exhibited smooth and uniform surface with small grain size. With increasing concentration of Si and Ti precursors, the film had rougher surface with more porous morphology. This is also consistent with the AFM results regarding surface roughness observation. From AFM results, the surface roughness of the $SiO_2$ film on SAM-PC substrate with different precursors concentrations are 10.1 nm and 23.7 nm root mean square roughness for FIGS. 21(C) and (D), respectively.

Figure 22:
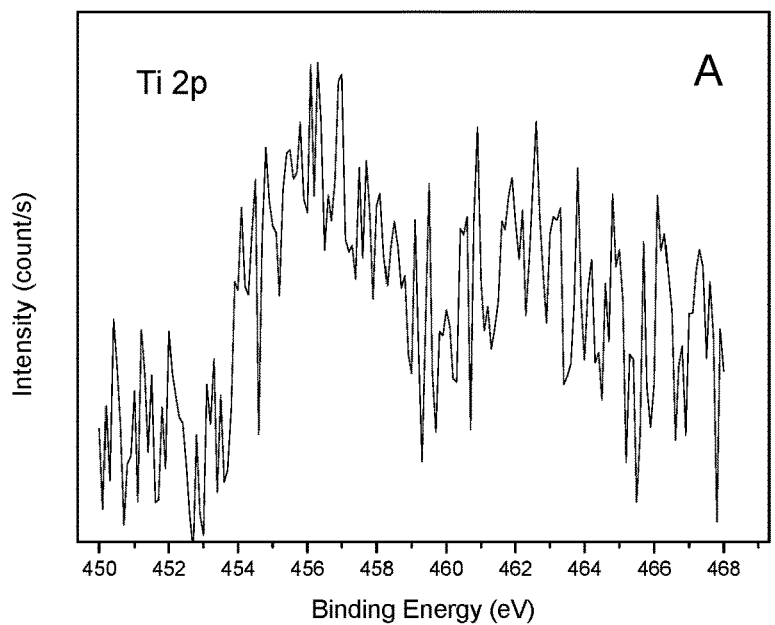
FIG. 22 shows XPS spectra of $SiO_2$ films deposited at (A) 0.05M AHFSi, 0.05M AHFT, 0.3M $H_3BO_3$; and (B) 0.1M AHFSi, 0.1M AHFT, 0.3M $H_3BO_3$.
Figure 22:
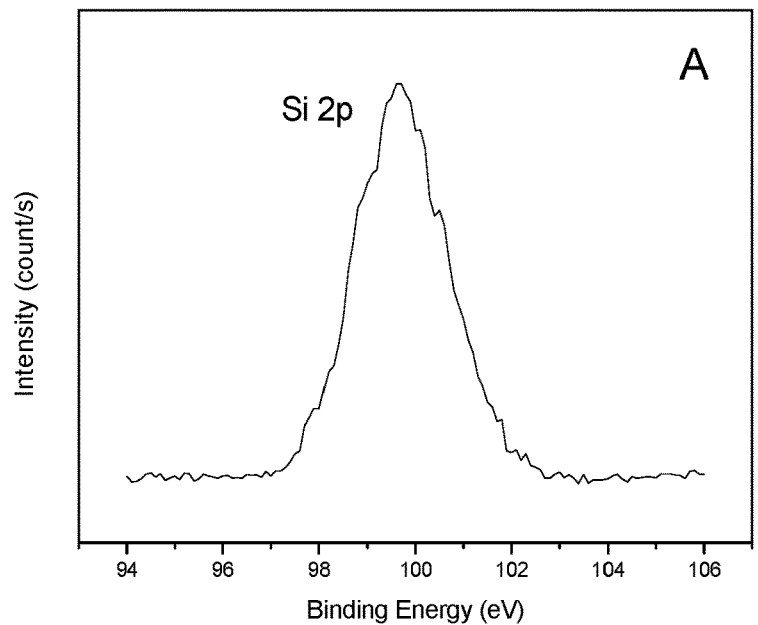
Figure 22:
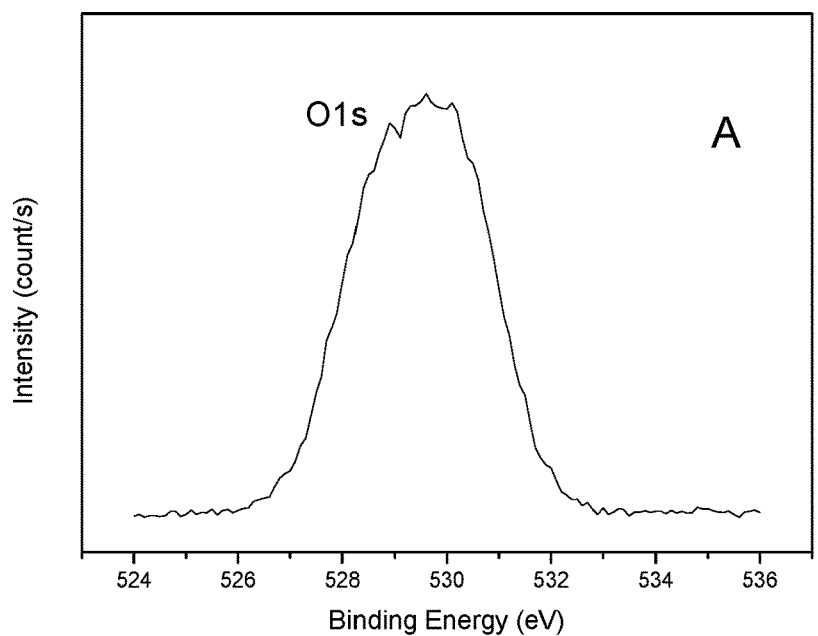
Figure 22:
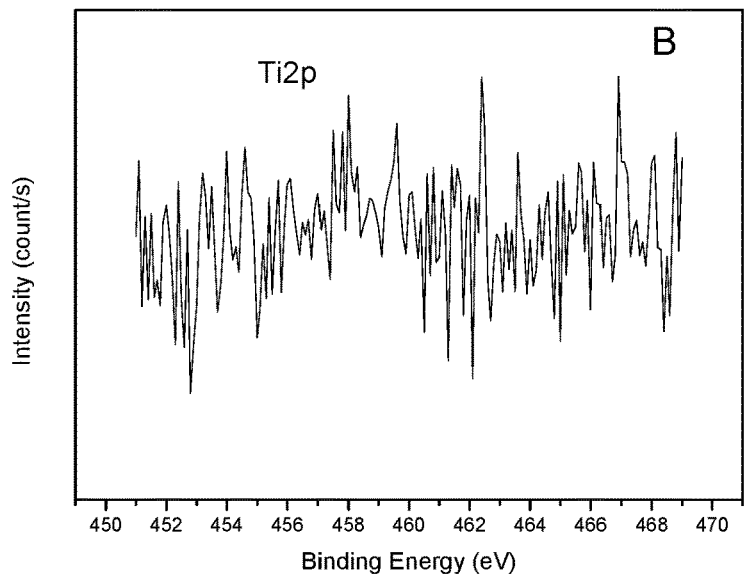
Figure 22:
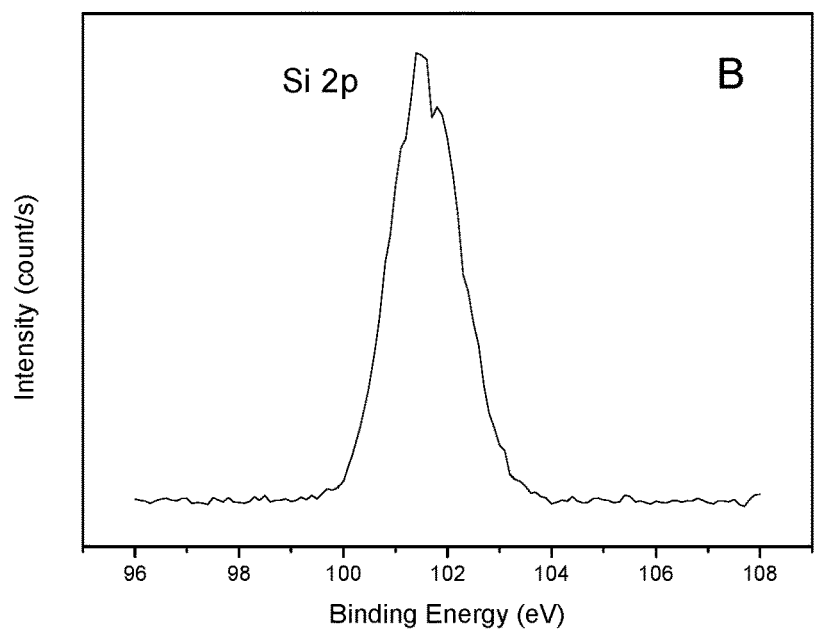
Figure 22:
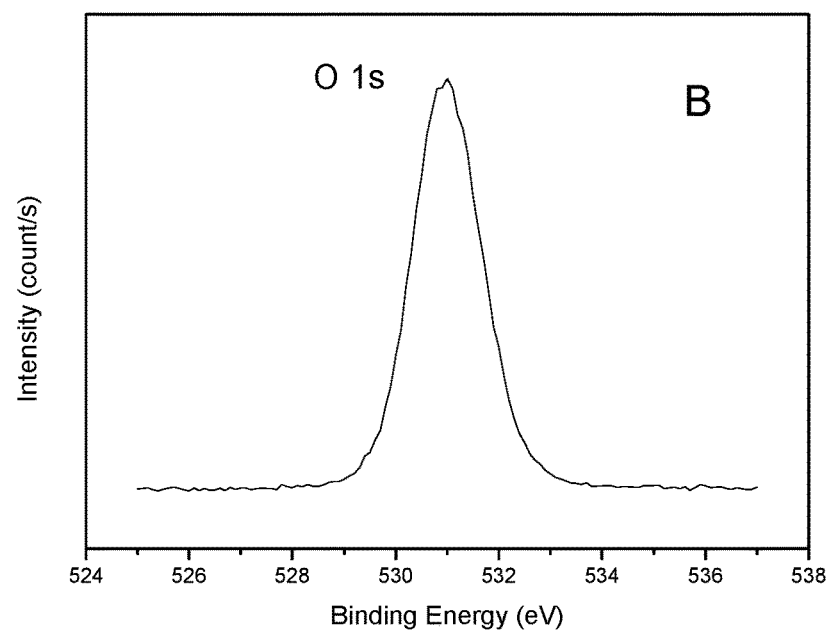

XPS results of the film at different growth conditions on SAM-PC for binding energy peaks corresponding to the Ti 2p, Si 2p, and O 1s electron orbitals are shown in FIG. 22. As tabulated in TABLE 5, only one condition shows Ti at less than 1 at %, while the rest do not show any Ti at all. As 1 at % is within the error limit, it can be said that all conditions produces pure $SiO_2$ films.

TABLE 5

Elemental composition of the films by XPS method.

| Growth condition (AHFSi, AHFTi, $H_3BO_3$) | O (At. %) | Si (At. %) | Ti (At. %) |
| --- | --- | --- | --- |
| 0.05M, 0.05M, 0.3M | 64.82 | 34.39 | 0.79 |
| 0.1M, 0.1M, 0.15M | 66.43 | 33.57 | 0 |
| 0.1M, 0.1M, 0.3M | 67.64 | 32.36 | 0 |

Figure 23:
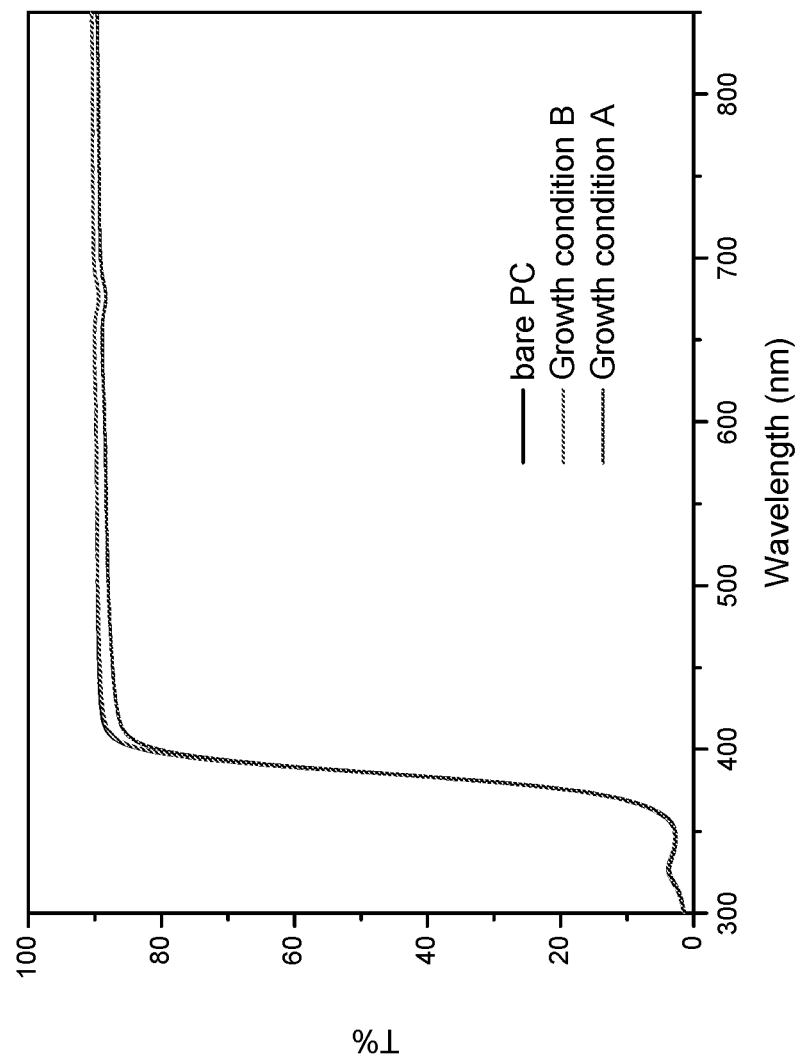
FIG. 23 shows UV-vis transmission spectra of $SiO_2$ films on PC with different growth conditions: Growth condition A: 0.05 M AHFSi, 0.05 M AHFT, 0.3 M $H_3BO_3$, Growth condition B: 0.1M AHFSi, 0.1M AHFT, 0.3M $H_3BO_3$.

The UV-Vis transmission spectra of the films are shown in FIG. 23. It shows that over the visible wavelength range of 400 nm to 800 nm, the transparency of the $SiO_2$ films is only slightly lower than that of the bare PC.

Figure 24:
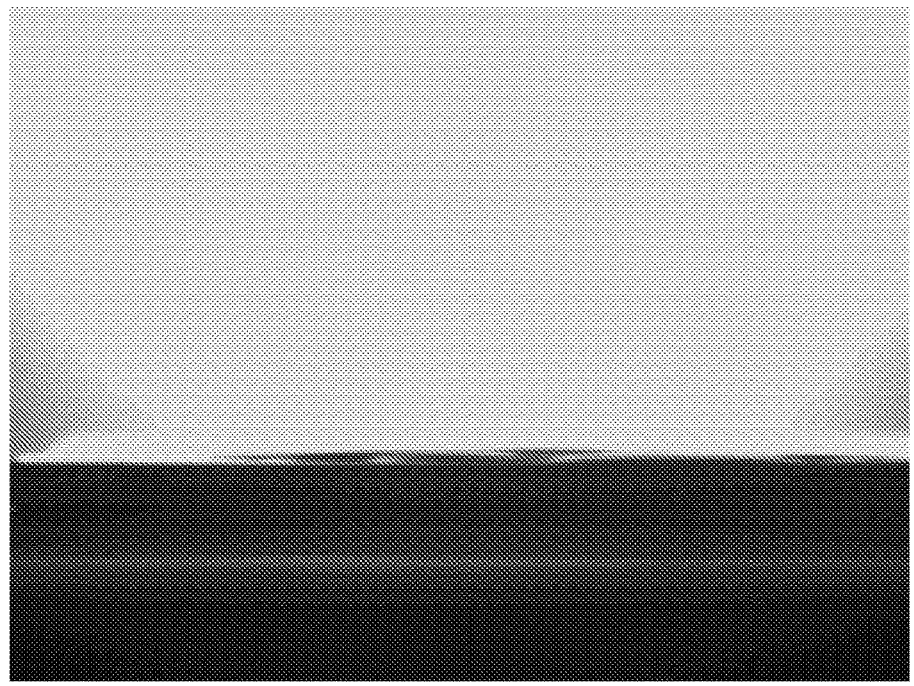
FIG. 24 shows water contact angle of $SiO_2$ film for growth condition of 0.1M AHFSi, 0.1 M AHFT, 0.3 M $H_3BO_3$.
Figure 25:
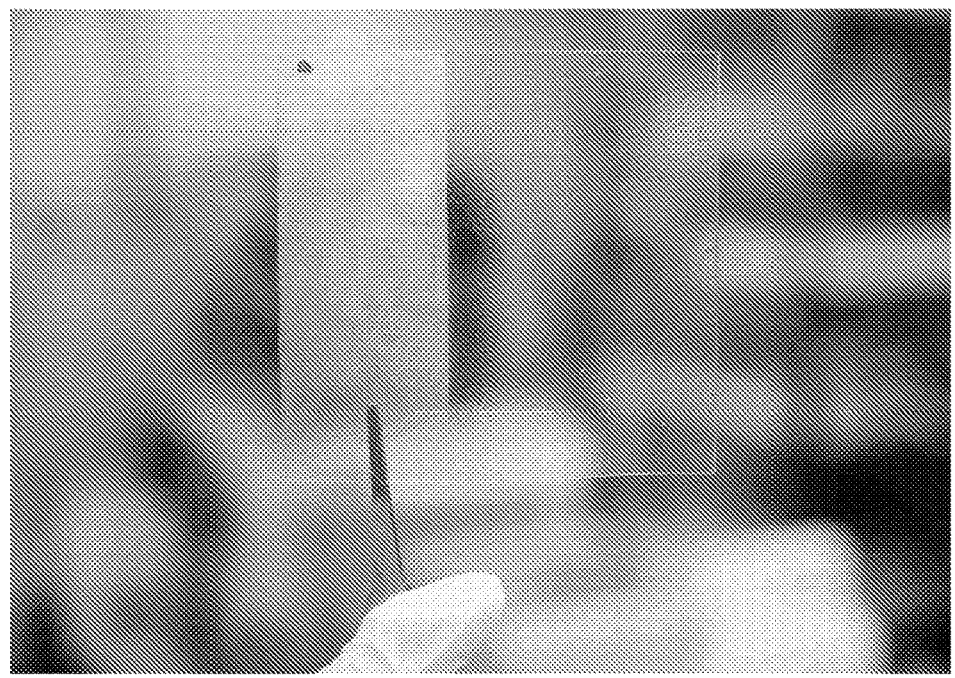
FIG. 25 is a photograph depicting anti-fogging properties of $SiO_2$ film which was coated on half of the polycarbonate substrate.

Water contact angles of all freshly prepared films revealed that a 2.0 μL water droplet on the film surface spreads within milliseconds and shows a contact angle of nearly zero (FIG. 24).

Potential application areas include hydrophilic coating for catheters, plastic endoscopy lenses; anti-fogging spectacle & camera lenses, windows, and mirrors; anti-frost film for freezer doors, tupperware containers; and primer for printing (e.g. AJA).

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for preparing an oxide film on a polymeric substrate, wherein the oxide film is a titanium oxide film or a silicon oxide film, the method comprising
    a) contacting a polymeric substrate with a liquid reagent comprising a polyalkoxysilane and forming a hydrophobic layer of the polyalkoxysilane on the polymeric substrate by self-assembly, and
    b) contacting the hydrophobic layer of the polyalkoxysilane on the polymeric substrate with an aqueous mixture comprising (i) titanium tetrafluoride and/or a fluorine-containing titanium complex and/or a fluorine-containing silicon complex, and (ii) a fluorine scavenger, at a temperature of less than about 100° C. to obtain the oxide film on the polymeric substrate.

2. The method according to claim 1, wherein the polyalkoxysilane is selected from the group consisting of 3-aminopropyltriethoxysilane, 3-aminopropyl-diethoxy-methyl silane, 3-aminopropyl-dimethyl-ethoxysilane (APDMES), 3-aminopropyl-trimethoxysilane (APTMS), 3-glycidoxypropyl-dimethyl-ethoxysilane (GPMES), 3-mercaptopropyl-trimethoxysilane (MPTMS), 3-mercaptopropyl-methyl-dimethoxysilane (MPDMS), and combinations thereof.

3. The method according to claim 1, wherein the fluorine-containing titanium complex or the fluorine-containing silicon complex has general formula $A_2MF_6$, wherein M is Ti or Si, and A is selected from the group consisting of an ammonium group, hydrogen, alkali metal, coordinated water, and combinations thereof.

4. The method according to claim 1, wherein the fluorine scavenger is selected from the group consisting of boric acid, alkali metal borate, ammonium borate, boron anhydride, boron monoxide, aluminum chloride, sodium hydroxide, aqueous ammonia, metallic aluminum, aluminum oxide, and combinations thereof.

5. The method according to claim 1, wherein the oxide film is a titanium oxide film optionally doped with Nb or Si.

6. The method according to claim 5, wherein the titanium oxide film is a Si-doped titanium oxide film.

7. The method according to claim 6, wherein atomic ratio of Si to Ti in the Si-doped titanium oxide film is in the range of about 10% to about 15%.

8. The method according to claim 6, wherein the aqueous mixture comprises at least one of titanium tetrafluoride or a fluorine-containing titanium complex, and a fluorine-containing silicon complex, wherein atomic ratio of the fluorine-containing silicon complex to the combination of titanium tetrafluoride and the fluorine-containing titanium complex in the aqueous mixture is less than 0.6.

9. The method according to claim 8, wherein the fluorine-containing titanium complex comprises $(NH_4)_2TiF_6$, and the fluorine-containing silicon complex comprises $(NH_4)_2SiF_6$.

10. The method according to claim 5, wherein the aqueous mixture further comprises an acidic solution, and pH of the aqueous mixture comprising the acidic solution is in the range of about 1 to about 5.

11. The method according to claim 5, wherein the titanium oxide film is at least substantially amorphous.

12. The method according to claim 5, wherein the titanium oxide film is photocatalytically active.

13. The method according to claim 5, wherein the titanium oxide film is a Nb-doped titanium oxide film and wherein the aqueous mixture further comprises a niobium salt.

14. The method according to claim 1, wherein the oxide film is a silicon oxide film, wherein the aqueous mixture comprises at least one of titanium tetrafluoride or a fluorine-containing titanium complex, and a fluorine-containing silicon complex, and wherein atomic ratio of the fluorine-containing silicon complex to the combination of titanium tetrafluoride and the fluorine-containing titanium complex in the aqueous mixture is 0.6 or more.

15. The method according to claim 14, wherein concentration of the fluorine-containing silicon complex in the aqueous mixture is in the range of about 0.1 M to about 0.2 M.

16. The method according to claim 14, wherein concentration of the fluorine scavenger in the aqueous mixture is in the range of about 0.2 M to about 0.6 M.

17. The method according to claim 1, wherein the oxide film is mesoporous.

18. The method according to claim 1, wherein the oxide film is superhydrophilic without requiring activation by UV excitation.

19. The method according to claim 1, wherein the oxide film is optically transparent and/or exhibits a transmittance of at least 70% in the wavelength region in the range from about 400 nm to about 800 nm.

20. A titanium oxide film or a silicon oxide film prepared by a method comprising
    a) contacting a polymeric substrate with a liquid reagent comprising a polyalkoxysilane and forming a hydrophobic layer of the polyalkoxysilane on the polymeric substrate by self-assembly, and
    b) contacting the hydrophobic layer of the polyalkoxysilane on the polymeric substrate with an aqueous mixture comprising (i) titanium tetrafluoride and/or a fluorine-containing titanium complex and/or a fluorine-containing silicon complex, and (ii) a fluorine scavenger, at a temperature of less than about 100° C. to obtain the oxide film on the polymeric substrate.

* * * * *